(12) United States Patent
Lin et al.

(10) Patent No.: US 12,436,367 B2
(45) Date of Patent: Oct. 7, 2025

(54) IMAGING SYSTEM LENS ASSEMBLY, IMAGE CAPTURING UNIT AND ELECTRONIC DEVICE

(71) Applicant: LARGAN PRECISION CO., LTD., Taichung (TW)

(72) Inventors: Yu Jui Lin, Taichung (TW); Cheng-Chen Lin, Taichung (TW); Chun-Che Hsueh, Taichung (TW); Hsin-Hsuan Huang, Taichung (TW); I-Hsuan Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 492 days.

(21) Appl. No.: 17/885,418

(22) Filed: Aug. 10, 2022

(65) Prior Publication Data
US 2023/0384558 A1 Nov. 30, 2023

(30) Foreign Application Priority Data
May 27, 2022 (TW) .................................. 111119830

(51) Int. Cl.
*G02B 9/62* (2006.01)
(52) U.S. Cl.
CPC ..................................... *G02B 9/62* (2013.01)
(58) Field of Classification Search
CPC .... G02B 13/18; G02B 13/16; G02B 13/0015; G02B 27/0172; G02B 27/0012;
(Continued)

(56) References Cited

U.S. PATENT DOCUMENTS

| 8,385,006 B2 | 2/2013 | Tsai et al. |
| 9,535,236 B2 | 1/2017 | Chen et al. |

(Continued)

FOREIGN PATENT DOCUMENTS

| CN | 204790153 U | 11/2015 |
| CN | 107390354 A | 11/2017 |

(Continued)

OTHER PUBLICATIONS

Warren J. Smith, "Modern Lens Design," McGraw-Hill, Inc, pp. 25-27 (Jan. 1, 1992).

(Continued)

*Primary Examiner* — Travis S Fissel
(74) *Attorney, Agent, or Firm* — Maschoff Brennan

(57) ABSTRACT

An imaging system lens assembly includes a first lens element, a second lens element, a third lens element, a fourth lens element, a fifth lens element and a sixth lens element in order from an object side to an image side along an optical path. Each of the six lens elements has an object-side surface facing toward the object side and an image-side surface facing toward the image side. The first lens element has positive refractive power. The fifth lens element has positive refractive power. The image-side surface of the fifth lens element is concave in a paraxial region thereof. The image-side surface of the sixth lens element has at least one inflection point. A central thickness of the first lens element is a maximum among central thicknesses of all lens elements of the imaging system lens assembly.

26 Claims, 26 Drawing Sheets

(58) Field of Classification Search
CPC .... G02B 27/0025; G02B 15/146; G02B 9/62; G02B 9/64; H04N 5/2254; H04N 5/222
USPC ......... 359/656–658, 708, 713, 749, 756–765
See application file for complete search history.

(56) References Cited

U.S. PATENT DOCUMENTS

| | | | |
|---|---|---|---|
| 9,547,157 B2 | 1/2017 | Chen et al. | |
| 9,671,589 B2 | 6/2017 | Chen et al. | |
| 9,690,075 B2 * | 6/2017 | Tang | G02B 13/002 |
| 10,025,074 B2 | 7/2018 | Katsuragi et al. | |
| 10,073,251 B2 | 9/2018 | Lin et al. | |
| 10,520,705 B2 | 12/2019 | Tang et al. | |
| 10,754,125 B2 | 8/2020 | Nitta et al. | |
| 10,996,440 B2 | 5/2021 | Li et al. | |
| 11,215,798 B2 | 1/2022 | Lin et al. | |
| 11,215,800 B2 | 1/2022 | Fukaya et al. | |
| 2018/0067283 A1 * | 3/2018 | Jhang | G02B 5/005 |
| 2021/0072508 A1 * | 3/2021 | Lin | G02B 9/62 |
| 2021/0247592 A1 | 8/2021 | Yoo | |
| 2022/0050274 A1 | 2/2022 | Tang et al. | |
| 2022/0113497 A1 | 4/2022 | Chuang | |
| 2022/0187572 A1 | 6/2022 | Sakaguchi et al. | |

FOREIGN PATENT DOCUMENTS

| | | |
|---|---|---|
| CN | 107966785 A | 4/2018 |
| CN | 209746255 U | 12/2019 |
| CN | 211478736 U | 9/2020 |
| CN | 211741697 U | 10/2020 |
| CN | 112230401 B | 5/2021 |
| CN | 113210824 A | 8/2021 |
| CN | 113741007 A | 12/2021 |
| CN | 217181317 U | 8/2022 |
| IN | 202034052695 A | 4/2022 |

OTHER PUBLICATIONS

Extended European Search Report dated Jun. 6, 2023 as received in Application No. 22188854.8.
Indian Examination Report dated Aug. 19, 2025 as received in applicatio No. 202334035231.

* cited by examiner

US 12,436,367 B2

IMAGING SYSTEM LENS ASSEMBLY, IMAGE CAPTURING UNIT AND ELECTRONIC DEVICE

RELATED APPLICATIONS

This application claims priority to Taiwan Application 111119830, filed on May 27, 2022, which is incorporated by reference herein in its entirety.

BACKGROUND

Technical Field

The present disclosure relates to an imaging system lens assembly, an image capturing unit and an electronic device, more particularly to an imaging system lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging system lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The fifth lens element has positive refractive power, and the image-side surface of the fifth lens element is concave in a paraxial region thereof. The image-side surface of the sixth lens element has at least one inflection point. A central thickness of the first lens element is a maximum among central thicknesses of all lens elements of the imaging system lens assembly. In addition, the imaging system lens assembly further includes an aperture stop.

When a curvature radius of the object-side surface of the first lens element is R1, a curvature radius of the image-side surface of the sixth lens element is R12, an Abbe number of the second lens element is V2, an Abbe number of the third lens element is V3, an Abbe number of the fourth lens element is V4, an axial distance between the aperture stop and the image-side surface of the sixth lens element is SD, and an axial distance between the object-side surface of the first lens element and the image-side surface of the sixth lens element is TD, the following conditions are satisfied:

$0.80 < (R1+R12)/(R1-R12) < 4.00;$ $0.30 < (V2+V3)/V4 < 1.30;$ and $0.92 < SD/TD < 1.20.$ According to another aspect of the present disclosure, an imaging system lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power, the object-side surface of the first lens element is convex in a paraxial region thereof, and the image-side surface of the first lens element is convex in a paraxial region thereof. The sixth lens element has negative refractive power, and the image-side surface of the sixth lens element has at least one inflection point.

When a central thickness of the first lens element is CT1, a maximum value among central thicknesses of the second lens element to the sixth lens element is max(CT2–6), a focal length of the imaging system lens assembly is f, a refractive index of the fourth lens element is N4, a refractive index of the fifth lens element is N5, a curvature radius of the image-side surface of the fourth lens element is R8, a curvature radius of the object-side surface of the fifth lens element is R9, an axial distance between the fourth lens element and the fifth lens element is T45, an Abbe number of the third lens element is V3, an Abbe number of the fourth lens element is V4, and a maximum field of view of the imaging system lens assembly is FOV, the following conditions are satisfied:

$1.40 < CT1/\max(CT2-6) < 5.00;$ $0.60 < f/\text{fair}45 < 3.00,$ wherein $1/\text{fair}45 = (1-N4)/(N5 \times R8) + (N5-1)/(N5 \times R9) - (1-N4) \times (N5-1) \times T45/(N5 \times R8 \times R9);$ $0.45 < V3/V4 < 0.90;$ and $86.0 \text{ degrees} < FOV < 130.0 \text{ degrees}.$ According to another aspect of the present disclosure, an imaging system lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has negative refractive power. The image-side surface of the fifth lens element is concave in a paraxial region thereof. The image-side surface of the sixth lens element has at least one inflection point. In addition, a central thickness of the first lens element is a maximum among central thicknesses of all lens elements of the imaging system lens assembly.

When an f-number of the imaging system lens assembly is Fno, a curvature radius of the object-side surface of the first lens element is R1, a curvature radius of the image-side surface of the sixth lens element is R12, a maximum effective radius of the object-side surface of the first lens element is Y1R1, and a distance in parallel with an optical axis between a maximum effective radius position of the object-side surface of the first lens element and a maximum effective radius position of the image-side surface of the first lens element is ET1, the following conditions are satisfied:

$1.50 < Fno < 2.10;$ $1.20 < (R1+R12)/(R1-R12) < 3.00;$ and $0.50 < Y1R1/ET1 < 2.00.$ According to another aspect of the present disclosure, an image capturing unit includes one of the aforementioned imaging system lens assemblies and an image sensor, wherein the image sensor is disposed on an image surface of the imaging system lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging system lens assembly includes six lens elements. The six lens elements are, in order from an object side to an image side along an optical path, a first lens element, a second lens element, a third lens element, a fourth lens element, a fifth lens element and a sixth lens element. Each of the six lens elements of the imaging system lens assembly has an object-side surface facing toward the object side and an image-side surface facing toward the image side.

The first lens element has positive refractive power. Therefore, it is favorable for reducing the size of the lens elements at the object side of the imaging system lens assembly. The object-side surface of the first lens element can be convex in a paraxial region thereof. Therefore, it is favorable for reducing the incident angle in the off-axis region on the first lens element so as to prevent total reflection. The image-side surface of the first lens element can be convex in a paraxial region thereof. Therefore, it is favorable for adjusting the shape and the refractive power of the first lens element so as to reduce the size of the imaging system lens assembly at the object side.

The second lens element can have negative refractive power. Therefore, it is favorable for correcting aberrations, such as spherical aberration, generated due to size reduction of the imaging system lens assembly. The object-side surface of second lens element can be convex in a paraxial region thereof. Therefore, it is favorable for adjusting the shape of the second lens element so as to refract light with a large incident angle and reduce the effective radius of the second lens element. The image-side surface of the second lens element can be concave in a paraxial region thereof. Therefore, it is favorable for adjusting the surface shape of the second lens element so as to correct aberrations, such as astigmatism.

The image-side surface of the third lens element can be concave in a paraxial region thereof. Therefore, it is favorable for balancing the capability to converge light rays with different wavelengths.

The fourth lens element can have negative refractive power. Therefore, it is favorable for collaborating with the third lens element so as to reduce coma in the off-axis region.

The fifth lens element can have positive refractive power. Therefore, it is favorable for controlling the back focal length of the imaging system lens assembly so as to reduce the total track length. The object-side surface of the fifth lens element can be convex in a paraxial region thereof. Therefore, it is favorable for adjusting the light travelling path so as to increase the area of the image surface. The image-side surface of the fifth lens element can be concave in a paraxial region thereof. Therefore, it is favorable for adjusting the shape of the image-side surface of the fifth lens element so as to reduce unwanted spots in the paraxial region of the image.

Figure 23:
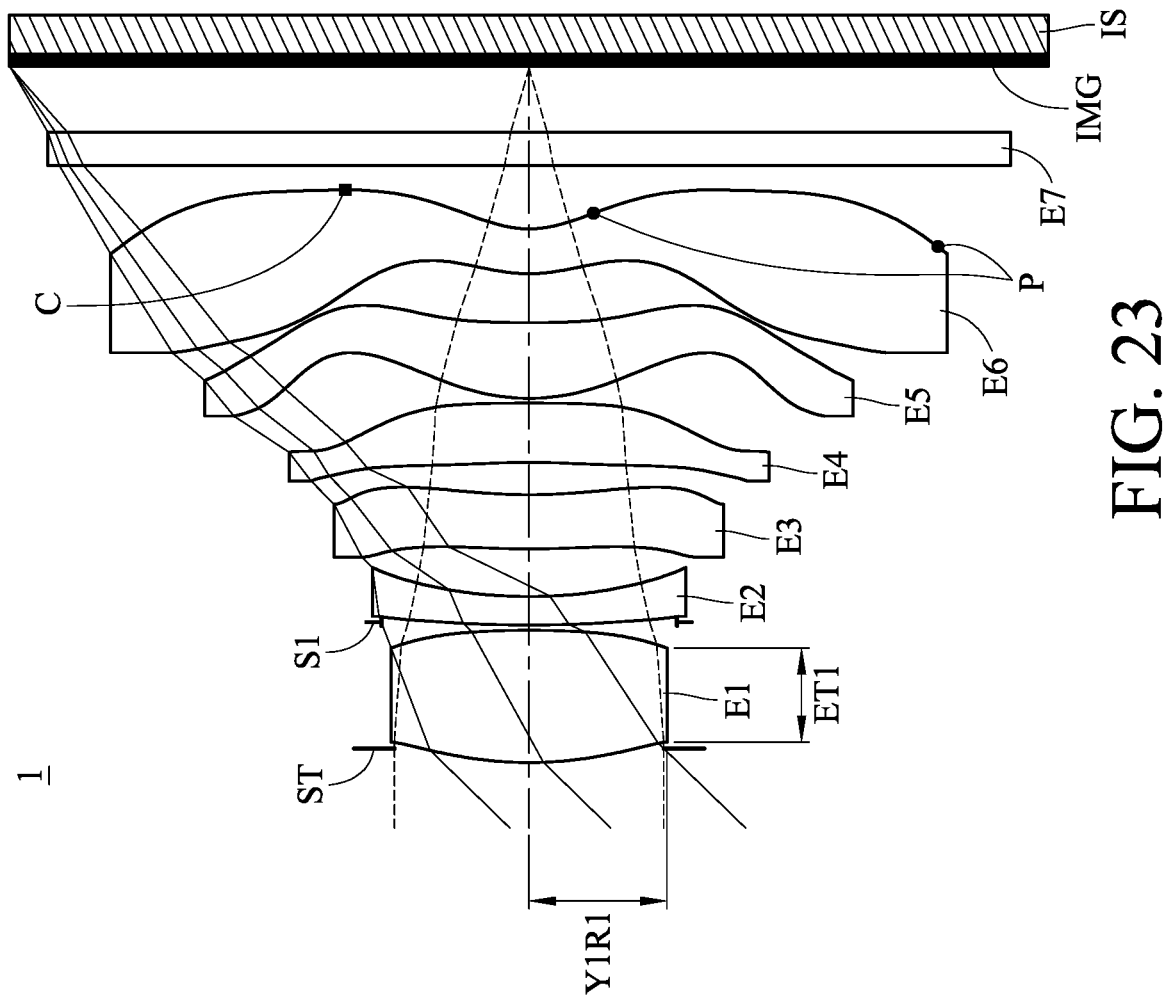
FIG. 23 shows a schematic view of Y1R1, ET1, two inflection points and one critical point of the image-side surface of the sixth lens element according to the 1st embodiment of the present disclosure.

The sixth lens element can have negative refractive power. Therefore, it is favorable for balancing the focusing positions in the paraxial and off-axis regions so as to correct field curvature. The image-side surface of the sixth lens element has at least one inflection point. Therefore, it is favorable for adjusting the incident angle of light rays on the image surface and controlling the incident angle of light rays in the off-axis region so as to reduce vignetting at the image periphery, improve Petzval field curvature and reduce distortion. Please refer to FIG. 23, which shows a schematic view of inflection points P of the image-side surface of the sixth lens element E6 according to the 1st embodiment of the present disclosure. The inflection points P of the image-side surface of the sixth lens element E6 in FIG. 23 are only exemplary. Each of the lens elements in various embodiments of the present disclosure can have one or more inflection points.

A central thickness of the first lens element can be a maximum among central thicknesses of all lens elements of the imaging system lens assembly. Therefore, it is favorable for adjusting the significant light converging capability provided by the first lens element so as to reduce the size of the imaging system lens assembly, thereby achieving compactness.

When a curvature radius of the object-side surface of the first lens element is R1, and a curvature radius of the image-side surface of the sixth lens element is R12, the following condition can be satisfied: 0.80<(R1+R12)/(R1−R12)<4.00. Therefore, it is favorable for adjusting the shape and the refractive power of the first lens element and the sixth lens element so as to obtain a balance between short total track length and improved light gathering quality. Moreover, the following condition can also be satisfied: 0.90<(R1+R12)/(R1−R12)<3.50. Moreover, the following condition can also be satisfied: 1.20<(R1+R12)/(R1−R12)<3.00. Moreover, the following condition can also be satisfied: 1.40<(R1+R12)/(R1−R12)<2.90.

When an Abbe number of the second lens element is V2, an Abbe number of the third lens element is V3, and an Abbe number of the fourth lens element is V4, the following condition can be satisfied: 0.30<(V2+V3)/V4<1.30. Therefore, it is favorable for balancing the arrangement of lens materials so as to optimize light modulating abilities of the lens elements. Moreover, the following condition can also be satisfied: 0.50<(V2+V3)/V4<1.26.

According to the present disclosure, the imaging system lens assembly further includes an aperture stop. When an axial distance between the aperture stop and the image-side surface of the sixth lens element is SD, and an axial distance between the object-side surface of the first lens element and the image-side surface of the sixth lens element is TD, the following condition can be satisfied: 0.92<SD/TD<1.20. Therefore, it is favorable for adjusting the position of the aperture stop to thereby provide the aperture stop at the object side of the imaging system lens assembly, which is helpful to reduce the total track length and increase relative illuminance of the image in the periphery region. Moreover, the following condition can also be satisfied: 0.94<SD/TD<1.00.

When a central thickness of the first lens element is CT1, and a maximum value among central thicknesses of the second lens element, the third lens element, the fourth lens element, the fifth lens element and the sixth lens element is max(CT2−6), the following condition can be satisfied: 1.40<CT1/max(CT2−6)<5.00. Therefore, it is favorable for adjusting the significant light converging capability provided by the first lens element so as to reduce the size of the imaging system lens assembly, thereby achieving compactness. Moreover, the following condition can also be satisfied: 1.40<CT1/max(CT2−6)<2.50. Moreover, the following condition can also be satisfied: 1.50<CT1/max(CT2−6)<1.80.

When a focal length of the imaging system lens assembly is f, a refractive index of the fourth lens element is N4, a refractive index of the fifth lens element is N5, a curvature radius of the image-side surface of the fourth lens element is R8, a curvature radius of the object-side surface of the fifth lens element is R9, and an axial distance between the fourth lens element and the fifth lens element is T45, the following condition can be satisfied: 0.60<f/fair45<3.00, wherein 1/fair45=(1−N4)/(N5×R8)−F(N5−1)/(N5×R9)−(1−N4)×(N5−1)×T45/(N5×R8×R9). Therefore, it is favorable for adjusting the refractive power of an air lens between the fourth lens element and the fifth lens element so as to correct distortion and reduce the incident angle of light on the image surface. Moreover, the following condition can also be satisfied: 0.60<f/fair45<1.00. It is noted that an air lens is provided in a space between two adjacent physical lens elements, the air between the two adjacent physical lens elements acts as the transmission medium, and two adjacent lens surfaces of the two adjacent physical lens elements act as refractive interfaces to converge light and correct periphery image.

When the Abbe number of the third lens element is V3, and the Abbe number of the fourth lens element is V4, the following condition can be satisfied: 0.45<V3/V4<0.90. Therefore, it is favorable for adjusting the arrangement of lens materials of the third lens element and the fourth lens element so as to correct aberrations.

When a maximum field of view of the imaging system lens assembly is FOV, the following condition can be satisfied: 86.0 degrees<FOV<130.0 degrees. Therefore, it is favorable for increasing the field of view for various applications, and preventing aberrations such as distortion caused by an overly large field of view. Moreover, the following condition can also be satisfied: 88.0 degrees<FOV<120.0 degrees. Moreover, the following condition can also be satisfied: 90.0 degrees<FOV<110.0 degrees.

When an f-number of the imaging system lens assembly is Fno, the following condition can be satisfied: 1.50<Fno<2.10. Therefore, it is favorable for adjusting the aperture size so as to increase the amount of incident light, so that high quality images can still be obtained in low-light conditions. Moreover, the following condition can also be satisfied: 1.50<Fno<2.00.

When a maximum effective radius of the object-side surface of the first lens element is Y1R1, and a distance in parallel with an optical axis between a maximum effective radius position of the object-side surface of the first lens element and a maximum effective radius position of the image-side surface of the first lens element is ET1, the following condition can be satisfied: 0.50<Y1R1/ET1<2.00. Therefore, it is favorable for adjusting the ratio of the effective radius of the object-side surface of the first lens element to the thickness at the periphery of the first lens element so as to obtain a balance between the reduction of the object side outer diameter of the imaging system lens assembly and the manufacturing difficulty. Moreover, the following condition can also be satisfied: 1.00<Y1R1/ET1<1.90. Moreover, the following condition can also be satisfied: 1.30<Y1R1/ET1<1.80. Please refer to FIG. 23, which shows a schematic view of Y1R1 and ET1 according to the 1st embodiment of the present disclosure.

When an entrance pupil diameter of the imaging system lens assembly is EPD, and an axial distance between the image-side surface of the sixth lens element and the image surface is BL, the following condition can be satisfied: 1.20<EPD/BL<4.00. Therefore, it is favorable for adjusting the ratio of the entrance pupil diameter to the back focal length so as to increase the aperture size and reduce the back focal length. Moreover, the following condition can also be satisfied: 1.20<EPD/BL<2.00.

When a curvature radius of the object-side surface of the fourth lens element is R7, and the curvature radius of the image-side surface of the fourth lens element is R8, the following condition can be satisfied: −50.00<(R7+R8)/(R7−R8)<0.00. Therefore, it is favorable for adjusting the shape and the refractive power of the fourth lens element so as to improve the light gathering quality in the paraxial region and the off-axis region. Moreover, the following condition can also be satisfied: −10.00<(R7+R8)/(R7−R8)<0.00.

When an axial distance between the object-side surface of the first lens element and the image surface is TL, and a maximum image height of the imaging system lens assembly (which can be half of a diagonal length of an effective photosensitive area of an image sensor) is ImgH, the following condition can be satisfied: 0.10<TL/ImgH<1.50. Therefore, it is favorable for adjusting the ratio of the total track length to the image surface size so as to reduce the size of the imaging system lens assembly and increase the light receiving area of the image sensor.

When the focal length of the imaging system lens assembly is f, a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following condition can be satisfied: 0.20<(|f/f1|+|f/f6|)/(|f/f2|+|f/f3|+|f/f4|+|f/f5|)<1.10. Therefore, it is favorable for adjusting the refractive power distribution among the lens elements at the front side and rear side and the lens elements at the middle portion so as to reduce the eccentricity sensitivity.

When the focal length of the first lens element is f1, and the focal length of the fourth lens element is f4, the following condition can be satisfied: −30.00<f4/f1<10.00. Therefore, it is favorable for adjusting the refractive power of the first lens element and the fourth lens element and balancing the refractive power distribution of the imaging system lens assembly so as to reduce the sensitivity of a single lens element and improve assembly yield rate. Moreover, the following condition can also be satisfied: −20.00<f4/f1<9.00. Moreover, the following condition can also be satisfied: −10.00<f4/f1<2.00.

When a curvature radius of the object-side surface of the sixth lens element is R11, and the curvature radius of the image-side surface of the sixth lens element is R12, the following condition can be satisfied: 2.00<(R11+R12)/(R11−R12)<13.00. Therefore, it is favorable for adjusting the shape and the refractive power of the sixth lens element so as to reduce the back focal length. Moreover, the following condition can also be satisfied: 2.50<(R11+R12)/(R11−R12)<10.00.

When the distance in parallel with the optical axis between the maximum effective radius position of the object-side surface of the first lens element and the maximum effective radius position of the image-side surface of the first lens element is ET1, and the central thickness of the first lens element is CT1, the following condition can be satisfied: 0.50<ET1/CT1<2.00. Therefore, it is favorable for adjusting the ratio of the peripheral thickness of the first lens element to the central thickness of the first lens element so as to ensure sufficient peripheral thickness for increasing assembly yield rate. Moreover, the following condition can also be satisfied: 0.50<ET1/CT1<1.00.

When the maximum effective radius of the object-side surface of the first lens element is Y1R1, and the maximum image height of the imaging system lens assembly is ImgH, the following condition can be satisfied: 0.10<Y1R1/ImgH<0.40. Therefore, it is favorable for adjusting the ratio of the effective radius of the object-side surface of the first lens element to the image surface size so as to reduce the object side outer diameter of the imaging system lens assembly, and thus, increase the screen-to-body ratio and provide a preferable device appearance.

When a composite focal length of the first lens element, the second lens element, the third lens element and the fourth lens element is f1234, and a composite focal length of the fifth lens element and the sixth lens element is f56, the following condition can be satisfied: 0.40<f1234/f56<5.00. Therefore, it is favorable for the four lens elements located closer to the front side to work with the two lens elements located closer to the rear side so as to correct aberrations, such as spherical aberration. Moreover, the following condition can also be satisfied: 0.80<f1234/f56<3.50.

When the axial distance between the fourth lens element and the fifth lens element is T45, and a sum of axial distances between each of all adjacent lens elements of the imaging system lens assembly is ΣAT, following condition can be satisfied: 0.01<T45/ΣAT<0.10. Therefore, it is favorable for adjusting the axial distances between each of all adjacent lens elements so as to reduce the size of the imaging system lens assembly.

When a curvature radius of the image-side surface of the fifth lens element is R10, and the curvature radius of the object-side surface of the sixth lens element is R11, the following condition can be satisfied: −0.10<R11/R10<0.25. Therefore, it is favorable for adjusting the ratio of the curvature radius of the image-side surface of the fifth lens element to the curvature radius of the object-side surface of the sixth lens element so as to reduce the degree of the spherical aberration in the paraxial region.

When an axial distance between the first lens element and the second lens element is T12, the axial distance between the fourth lens element and the fifth lens element is T45, and an axial distance between the fifth lens element and the sixth lens element is T56, the following condition can be satisfied: 0.20 (T12+T45)/T56<5.00. Therefore, it is favorable for adjusting the ratio between the axial distances between lens elements so as to obtain a balance between reducing manufacturing errors and reducing the influence of temperature variation. Moreover, the following condition can also be satisfied: 0.20≤(T12+T45)/T56<1.00. Moreover, the following condition can also be satisfied: 0.20≤(T12+T45)/T56<0.50.

When the central thickness of the first lens element is CT1, and a central thickness of the second lens element is CT2, the following condition can be satisfied: 3.50<CT1/CT2<8.00. Therefore, it is favorable for adjusting the ratio of the central thickness of the first lens element to the central thickness of the second lens element, so that the first lens element can provide a significant light converging capability to the imaging system lens assembly. Moreover, the following condition can also be satisfied: 4.50<CT1/CT2<6.00.

When the focal length of the fifth lens element is f5, and the focal length of the sixth lens element is f6, the following condition can be satisfied: −1.00<f5/f6<1.00. Therefore, it is favorable for adjusting the refractive power of the fifth lens element and the sixth lens element and balancing the refractive power distribution at the image side of the imaging system lens assembly so as to correct aberrations. Moreover, the following condition can also be satisfied: −1.00<f5/f6<0.00.

When a curvature radius of the object-side surface of the third lens element is R5, and a curvature radius of the image-side surface of the third lens element is R6, the following condition can be satisfied: −20.00<(R5+R6)/(R5−R6)<80.00. Therefore, it is favorable for adjusting the shape and the refractive power of the third lens element so as to adjust the light travelling path and therefore improve the image quality.

According to the present disclosure, the aforementioned features and conditions can be utilized in numerous combinations so as to achieve corresponding effects.

According to the present disclosure, the lens elements of the imaging system lens assembly can be made of either glass or plastic material. When the lens elements are made of glass material, the refractive power distribution of the imaging system lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging system lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis. Please refer to FIG. 23, which shows a schematic view of one non-axial critical point C of the image-side surface of the sixth lens element E6 according to the 1st embodiment of the present disclosure. The non-axial critical point C of the image-side surface of the sixth lens element E6 in FIG. 23 is only exemplary. Each of the lens elements in various embodiments of the present disclosure can have one or more non-axial critical points.

According to the present disclosure, the image surface of the imaging system lens assembly, based on the corresponding image sensor, can be flat or curved, especially a curved surface being concave facing towards the object side of the imaging system lens assembly.

According to the present disclosure, an image correction unit, such as a field flattener, can be optionally disposed between the lens element closest to the image side of the imaging system lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 24:
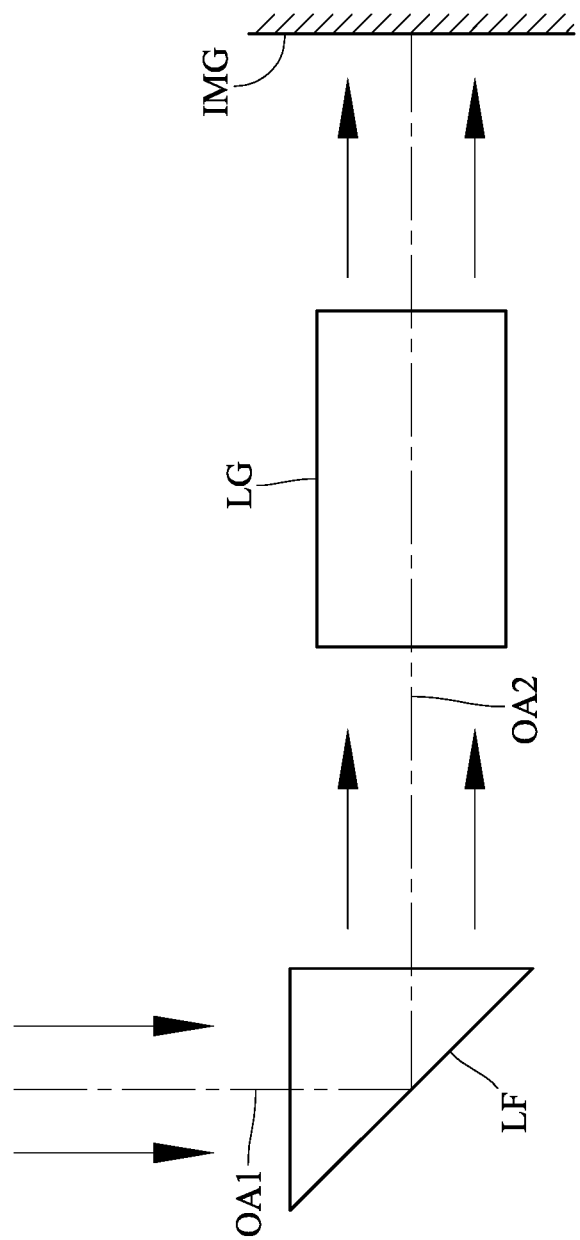
FIG. 24 shows a schematic view of a configuration of one light-folding element in an imaging system lens assembly according to one embodiment of the present disclosure.
Figure 25:
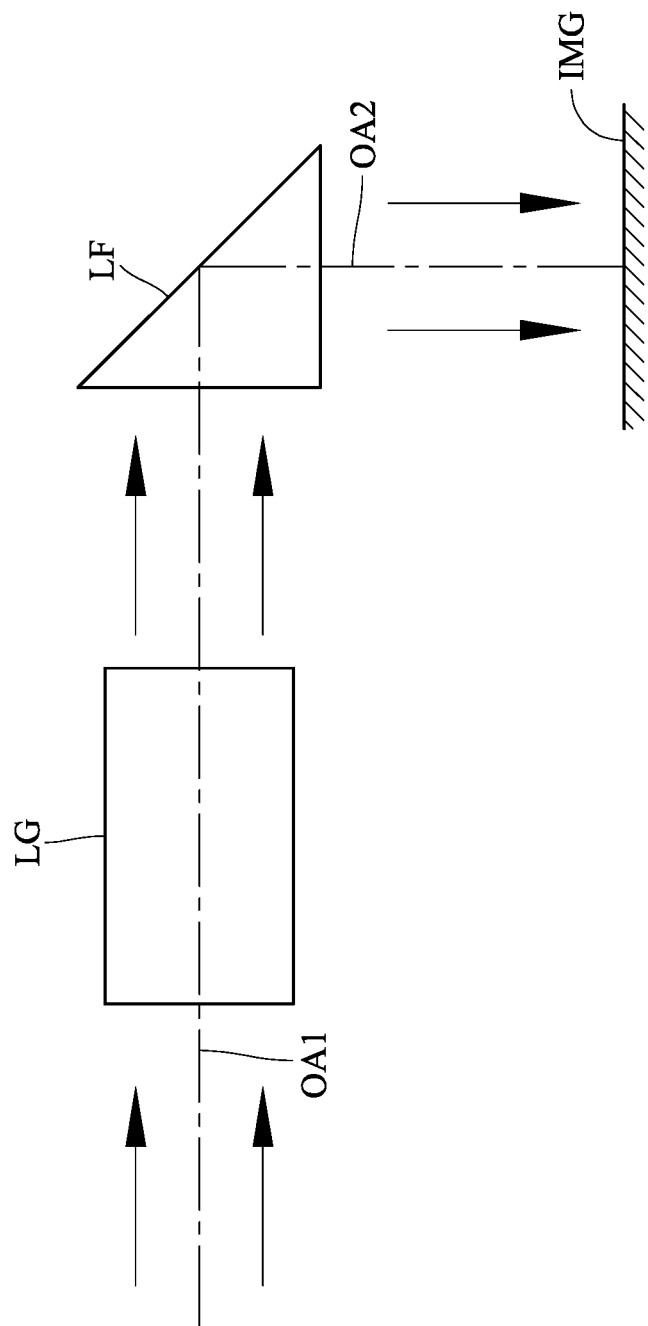
FIG. 25 shows a schematic view of another configuration of one light-folding element in an imaging system lens assembly according to one embodiment of the present disclosure.

According to the present disclosure, at least one light-folding element, such as a prism or a mirror, can be optionally disposed between an imaged object and the image surface on the imaging optical path, such that the imaging system lens assembly can be more flexible in space arrangement, and therefore the dimensions of an electronic device is not restricted by the total track length of the imaging system lens assembly. Specifically, please refer to FIG. 24 and FIG. 25. FIG. 24 shows a schematic view of a configuration of a light-folding element in an imaging system lens assembly according to one embodiment of the present disclosure, and FIG. 25 shows a schematic view of another configuration of a light-folding element in an imaging system lens assembly according to one embodiment of the present disclosure. In FIG. 24 and FIG. 25, the imaging system lens assembly can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging system lens assembly as shown in FIG. 24 or disposed between a lens group LG of the imaging system lens assembly and the image surface IMG as shown in FIG. 25. Furthermore, please refer to FIG.

Figure 26:
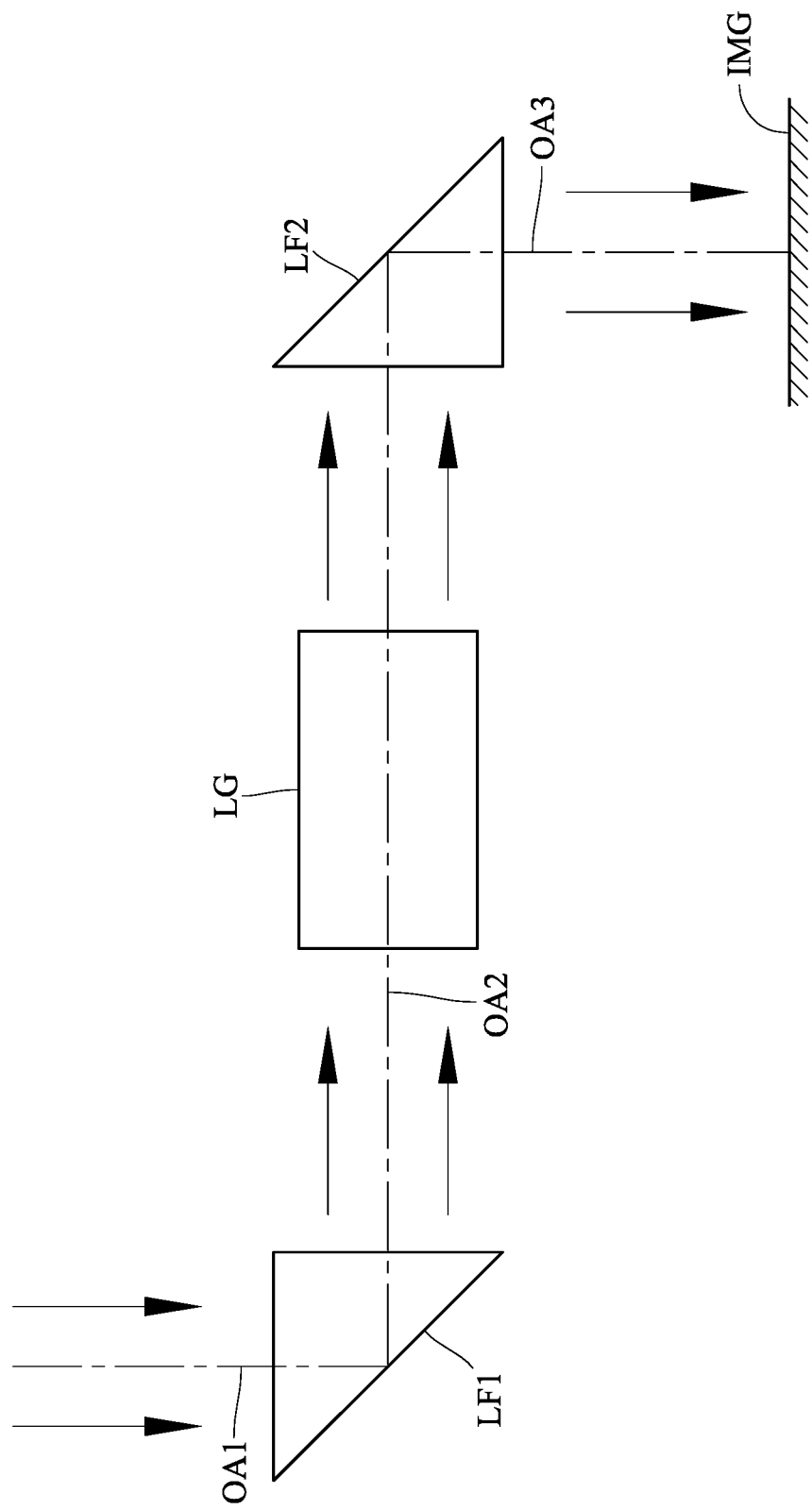
FIG. 26 shows a schematic view of a configuration of two light-folding elements in an imaging system lens assembly according to one embodiment of the present disclosure.

26, which shows a schematic view of a configuration of two light-folding elements in an imaging system lens assembly according to one embodiment of the present disclosure. In FIG. 26, the imaging system lens assembly can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging system lens assembly, the second light-folding element LF2 is disposed between the lens group LG of the imaging system lens assembly and the image surface IMG, and the travelling direction of light on the first optical axis OA1 can be the same direction as the travelling direction of light on the third optical axis OA3 as shown in FIG. 26. The imaging system lens assembly can be optionally provided with three or more light-folding elements, and the present disclosure is not limited to the type, amount and position of the light-folding elements of the embodiments disclosed in the aforementioned figures.

According to the present disclosure, the imaging system lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging system lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging system lens assembly and thereby provides a wider field of view for the same.

According to the present disclosure, the imaging system lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the imaging system lens assembly can include one or more optical elements for limiting the form of light passing through the imaging system lens assembly. Each optical element can be, but not limited to, a filter, a polarizer, etc., and each optical element can be, but not limited to, a single-piece element, a composite component, a thin film, etc. The optical element can be located at the front side or the rear side of the imaging system lens assembly or between any two adjacent lens elements so as to allow light in a specific form to pass through, thereby meeting application requirements.

According to the above description of the present disclosure, the following specific embodiments are provided for further explanation.

1st Embodiment

Figure 1:
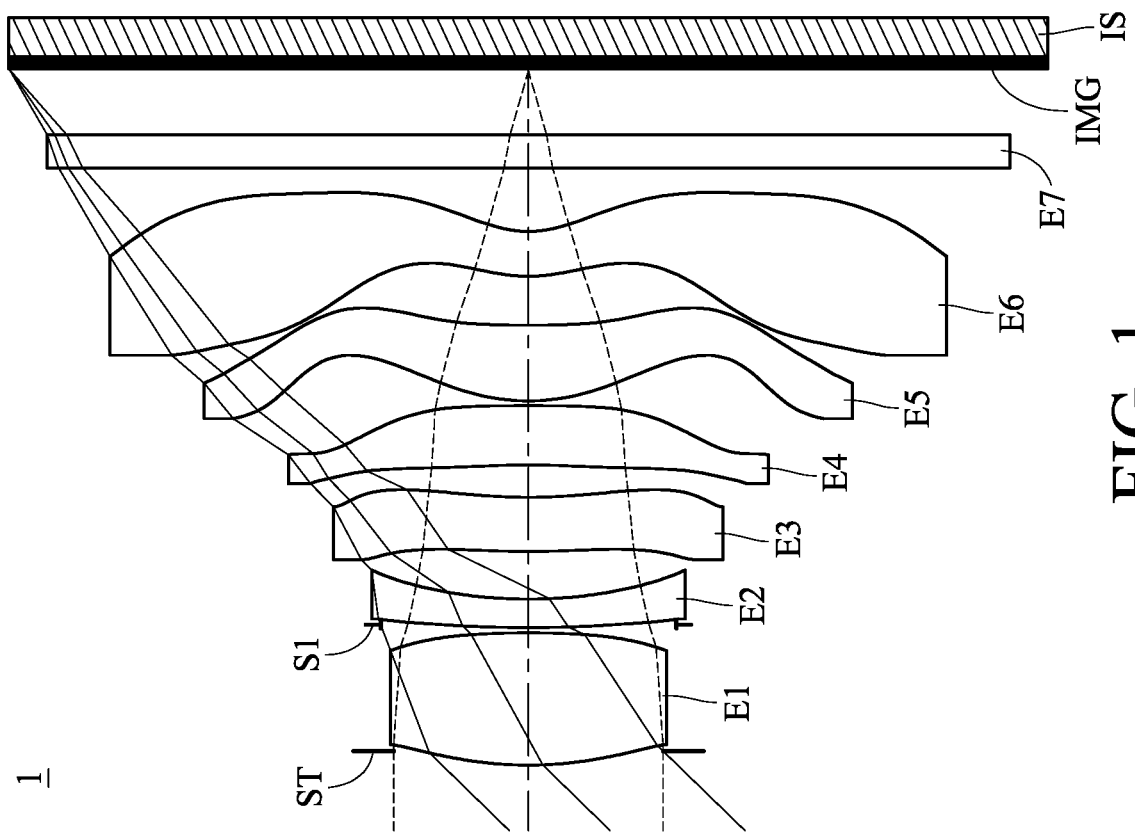
FIG. 1 is a schematic view of an image capturing unit according to the 1st embodiment of the present disclosure.
Figure 2:
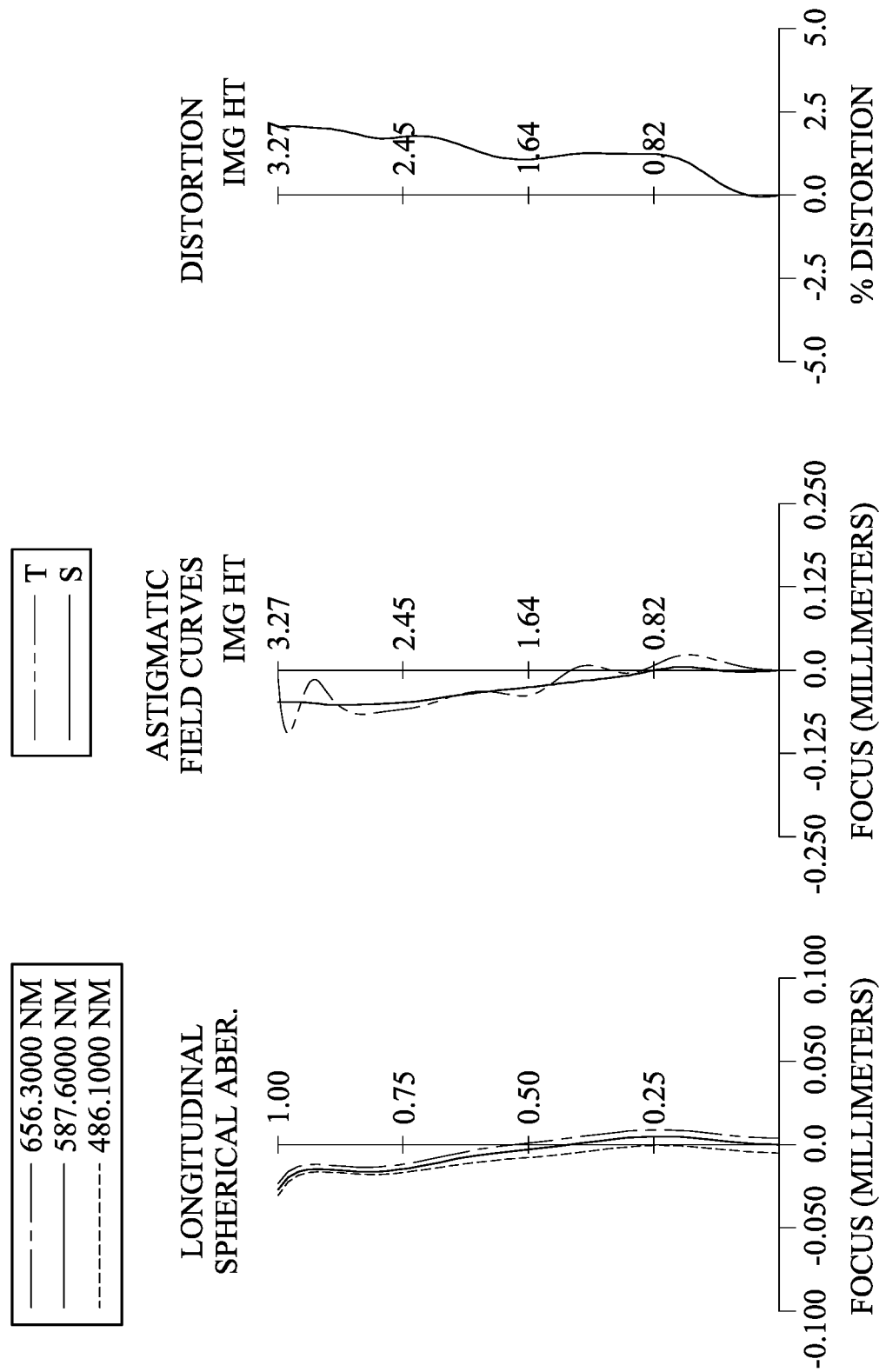
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging system lens assembly (its reference numeral is omitted) of the present disclosure and an image sensor IS. The imaging system lens assembly includes, in order from an object side to an image side along an optical axis, an aperture stop ST, a first lens element E1, a stop S1, a second lens element E2, a third lens element E3, a fourth lens element E4, a fifth lens element E5, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one critical point in an off-axis region thereof. The image-side surface of the third lens element E3 has one critical point in an off-axis region thereof.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has four inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has four inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has two inflection points. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, 28, and 30.

In the imaging system lens assembly of the image capturing unit according to the 1st embodiment, when a focal length of the imaging system lens assembly is f, an f-number of the imaging system lens assembly is Fno, and half of a maximum field of view of the imaging system lens assembly is HFOV, these parameters have the following values: f=3.12 millimeters (mm), Fno=1.84, and HFOV=45.8 degrees (deg.).

When the maximum field of view of the imaging system lens assembly is FOV, the following condition is satisfied: FOV=91.7 degrees.

When a curvature radius of the object-side surface of the first lens element E1 is R1, and a curvature radius of the image-side surface of the sixth lens element E6 is R12, the following condition is satisfied: (R1+R12)/(R1−R12)=1.77.

When a curvature radius of the object-side surface of the sixth lens element E6 is R11, and the curvature radius of the image-side surface of the sixth lens element E6 is R12, the following condition is satisfied: (R11+R12)/(R11−R12)=5.13.

When a curvature radius of the object-side surface of the third lens element E3 is R5, and a curvature radius of the image-side surface of the third lens element E3 is R6, the following condition is satisfied: (R5+R6)/(R5−R6)=5.17.

When a curvature radius of the object-side surface of the fourth lens element E4 is R7, and a curvature radius of the image-side surface of the fourth lens element E4 is R8, the following condition is satisfied: (R7+R8)/(R7−R8)=−2.00.

When a curvature radius of the image-side surface of the fifth lens element E5 is R10, and the curvature radius of the object-side surface of the sixth lens element E6 is R11, the following condition is satisfied: R11/R10=0.11.

When an Abbe number of the second lens element E2 is V2, an Abbe number of the third lens element E3 is V3, and an Abbe number of the fourth lens element E4 is V4, the following condition is satisfied: (V2+V3)/V4=1.25. When the Abbe number of the third lens element E3 is V3, and the Abbe number of the fourth lens element E4 is V4, the following condition is satisfied: V3/V4=0.84.

When the focal length of the imaging system lens assembly is f, a focal length of the first lens element E1 is f1, a focal length of the second lens element E2 is f2, a focal length of the third lens element E3 is f3, a focal length of the fourth lens element E4 is f4, a focal length of the fifth lens element E5 is f5, and a focal length of the sixth lens element E6 is f6, the following condition is satisfied: (|f/f1|+|f/f6|)/(|f/f2|+|f/f3|+|f/f4|+|f/f5|)=0.82.

When the focal length of the imaging system lens assembly is f, a refractive index of the fourth lens element E4 is N4, a refractive index of the fifth lens element E5 is N5, the curvature radius of the image-side surface of the fourth lens element E4 is R8, a curvature radius of the object-side surface of the fifth lens element E5 is R9, and an axial distance between the fourth lens element E4 and the fifth lens element E5 is T45, the following condition is satisfied: f/fair45=0.89, wherein 1/fair45=(1−N4)/(N5×R8)−F(N5−1)/(N5×R9)−(1−N4)×(N5−1)×T45/(N5×R8×R9).

When a composite focal length of the first lens element E1, the second lens element E2, the third lens element E3 and the fourth lens element E4 is f1234, and a composite focal length of the fifth lens element E5 and the sixth lens element E6 is f56, the following condition is satisfied: f1234/f56=2.13.

When the focal length of the first lens element E1 is f1, and the focal length of the fourth lens element E4 is f4, the following condition is satisfied: f4/f1=−4.11.

When the focal length of the fifth lens element E5 is f5, and the focal length of the sixth lens element E6 is f6, the following condition is satisfied: f5/f6=−0.54.

When a central thickness of the first lens element E1 is CT1, and a central thickness of the second lens element E2 is CT2, the following condition is satisfied: CT1/CT2=4.64.

When the central thickness of the first lens element E1 is CT1, and a maximum value among central thicknesses of the second lens element E2 to the sixth lens element E6 is max(CT2–6), the following condition is satisfied: CT1/max(CT2–6)=1.75. In this embodiment, among the second lens element E2, the third lens element E3, the fourth lens element E4, the fifth lens element E5 and the sixth lens element E6, the central thickness of the fifth lens element E5 is larger than the central thicknesses of the other lens elements, and thus max(CT2–6) is equal to the central thickness of the fifth lens element E5.

When an axial distance between the first lens element E1 and the second lens element E2 is T12, the axial distance between the fourth lens element E4 and the fifth lens element E5 is T45, and an axial distance between the fifth lens element E5 and the sixth lens element E6 is T56, the following condition is satisfied: (T12+T45)/T56=0.20. In this embodiment, an axial distance between two adjacent lens elements is a distance in a paraxial region between two adjacent lens surfaces of the two adjacent lens elements.

When the axial distance between the fourth lens element E4 and the fifth lens element E5 is T45, and a sum of axial distances between each of all adjacent lens elements of the imaging system lens assembly is ΣAT, the following condition is satisfied: T45/ΣAT=0.03. In this embodiment, ΣAT is the sum of the axial distances between the first lens element E1 and the second lens element E2, the second lens element E2 and the third lens element E3, the third lens element E3 and the fourth lens element E4, the fourth lens element E4 and the fifth lens element E5, and the fifth lens element E5 and the sixth lens element E6.

When an axial distance between the aperture stop ST and the image-side surface of the sixth lens element E6 is SD, and an axial distance between the object-side surface of the first lens element E1 and the image-side surface of the sixth lens element E6 is TD, the following condition is satisfied: SD/TD=0.97.

When an entrance pupil diameter of the imaging system lens assembly is EPD, and an axial distance between the image-side surface of the sixth lens element E6 and the image surface IMG is BL, the following condition is satisfied: EPD/BL=1.66.

When a distance in parallel with the optical axis between a maximum effective radius position of the object-side surface of the first lens element E1 and a maximum effective radius position of the image-side surface of the first lens element E1 is ET1, and the central thickness of the first lens element E1 is CT1, the following condition is satisfied: ET1/CT1=0.71.

When an axial distance between the object-side surface of the first lens element E1 and the image surface IMG is TL, and a maximum image height of the imaging system lens assembly is ImgH, the following condition is satisfied: TL/ImgH=1.34.

When a maximum effective radius of the object-side surface of the first lens element E1 is Y1R1, and the distance in parallel with the optical axis between the maximum effective radius position of the object-side surface of the first lens element E1 and the maximum effective radius position of the image-side surface of the first lens element E1 is ET1, the following condition is satisfied: Y1R1/ET1=1.43.

When the maximum effective radius of the object-side surface of the first lens element E1 is Y1R1, and the maximum image height of the imaging system lens assembly is ImgH, the following condition is satisfied: Y1R1/ImgH=0.26.

The detailed optical data of the 1st embodiment are shown in Table 1A and the aspheric surface data are shown in Table 1B below.

TABLE 1A

1st Embodiment
f = 3.12 mm, Fno = 1.84, HFOV = 45.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.089 | | | | |
| 2 | Lens 1 | 2.3548 (ASP) | 0.835 | Plastic | 1.544 | 56.0 | 3.20 |
| 3 | | −5.8783 (ASP) | 0.052 | | | | |
| 4 | Stop | Plano | −0.019 | | | | |
| 5 | Lens 2 | 8.9967 (ASP) | 0.180 | Plastic | 1.686 | 18.4 | −7.41 |
| 6 | | 3.2218 (ASP) | 0.300 | | | | |
| 7 | Lens 3 | 5.2619 (ASP) | 0.342 | Plastic | 1.566 | 37.4 | −20.89 |
| 8 | | 3.5557 (ASP) | 0.204 | | | | |
| 9 | Lens 4 | −4.8661 (ASP) | 0.374 | Plastic | 1.562 | 44.6 | −13.18 |
| 10 | | −14.5936 (ASP) | 0.030 | | | | |
| 11 | Lens 5 | 1.3551 (ASP) | 0.477 | Plastic | 1.544 | 56.0 | 2.88 |
| 12 | | 8.7471 (ASP) | 0.309 | | | | |
| 13 | Lens 6 | 0.9704 (ASP) | 0.283 | Plastic | 1.544 | 56.0 | −5.38 |
| 14 | | 0.6538 (ASP) | 0.400 | | | | |
| 15 | Filter | Plano | 0.210 | Glass | 1.517 | 64.2 | — |
| 16 | | Plano | 0.416 | | | | |
| 17 | Image | Plano | — | | | | |

Note:
Reference wavelength is 587.6 nm (d-line).
An effective radius of the stop S1 (Surface 4) is 0.931 mm.

TABLE 1B

Aspheric Coefficients

| Surface # | 2 | 3 | 4 | 5 |
|---|---|---|---|---|
| k = | −6.881250000E−02 | 3.107790000E+00 | 3.328360000E+01 | −1.700590000E+01 |
| A4 = | −5.267431831E−02 | −3.193142845E−02 | 6.633994371E−02 | 1.115914881E−01 |
| A6 = | 2.128898481E−01 | −8.048338234E−02 | −1.939166771E−01 | −7.592485714E−02 |
| A8 = | −1.291288603E+00 | −4.824883550E−01 | −1.558479485E−02 | 3.233828312E−02 |
| A10 = | 4.091060849E+00 | 1.899308279E+00 | 4.438538074E−01 | −1.699022390E−01 |
| A12 = | −8.011604716E+00 | −2.847811400E+00 | −3.706726928E−01 | 4.345114763E−01 |
| A14 = | 9.441422823E+00 | 2.049647154E+00 | 2.835979756E−02 | −3.743566709E−01 |
| A16 = | −6.205975088E+00 | −5.958003256E−01 | 4.293810163E−02 | 1.121386895E−01 |
| A18 = | 1.756488412E+00 | — | — | — |

| Surface # | 7 | 8 | 9 | 10 |
|---|---|---|---|---|
| k = | 5.858780000E+00 | 1.018570000E+00 | −3.115380000E+01 | 5.676580000E+00 |
| A4 = | −1.583409621E−01 | −8.566147345E−02 | 5.643143783E−02 | −2.276245023E−02 |
| A6 = | −2.920498169E−01 | −1.945227643E−02 | 1.716403530E+00 | 2.284136476E−01 |
| A8 = | 1.956409184E+00 | −3.487380151E−01 | −1.249876002E+01 | −5.697774582E+00 |

TABLE 1B-continued

Aspheric Coefficients

| | | | | |
|---|---|---|---|---|
| A10 = | −5.953087951E+00 | 1.494446148E+00 | 4.837884641E+01 | 2.526208383E+01 |
| A12 = | 1.044110813E+01 | −3.001338951E+00 | −1.242593889E+02 | −6.166629692E+01 |
| A14 = | −1.069835809E+01 | 3.452593574E+00 | 2.259701025E+02 | 9.932606922E+01 |
| A16 = | 5.863025587E+00 | −2.349974266E+00 | −2.993510387E+02 | −1.125577948E+02 |
| A18 = | −1.305570186E+00 | 8.713891260E−01 | 2.920836592E+02 | 9.206497431E+01 |
| A20 = | — | −1.333036930E−01 | −2.095528411E+02 | −5.465989057E+01 |
| A22 = | — | — | 1.089765192E+02 | 2.333856706E+01 |
| A24 = | — | — | −3.985457723E+01 | −6.982765698E+00 |
| A26 = | — | — | 9.690960653E+00 | 1.389302473E+00 |
| A28 = | — | — | −1.402669757E+00 | −1.650706576E−01 |
| A30 = | — | — | 9.121393007E−02 | 8.860630271E−03 |

| Surface # | 11 | 12 | 13 | 14 |
|---|---|---|---|---|
| k = | −9.997470000E−01 | −1.335730000E+00 | −4.391730000E+00 | −1.147360000E+00 |
| A4 = | 1.901273741E−01 | 1.110999614E−01 | −5.656093714E−01 | −1.162398861E+00 |
| A6 = | −9.731231365E−01 | 9.064867695E−01 | −9.941097039E−03 | 1.425487219E+00 |
| A8 = | 2.034299771E+00 | −3.796593423E+00 | 1.114920528E+00 | −1.265995958E+00 |
| A10 = | −3.521013325E+00 | 7.228442859E+00 | −2.199188943E+00 | 7.917094049E−01 |
| A12 = | 4.961660969E+00 | −8.820377267E+00 | 2.427871706E+00 | −3.296953029E−01 |
| A14 = | −5.453276565E+00 | 7.481203371E+00 | −1.732362045E+00 | 8.272336493E−02 |
| A16 = | 4.510145008E+00 | −4.549705197E+00 | 8.459060529E−01 | −7.264891816E−03 |
| A18 = | −2.748849632E+00 | 2.009989150E+00 | −2.912402776E−01 | −2.813943224E−03 |
| A20 = | 1.215466865E+00 | −6.458229824E−01 | 7.154630862E−02 | 1.284449764E−03 |
| A22 = | −3.825066767E−01 | 1.493190839E−01 | −1.249019607E−02 | −2.644881307E−04 |
| A24 = | 8.311840541E−02 | −2.419913363E−02 | 1.515312652E−03 | 3.292950684E−05 |
| A26 = | −1.182103281E−02 | 2.609221456E−03 | −1.215333044E−04 | −2.537862150E−06 |
| A28 = | 9.885527643E−04 | −1.681522029E−04 | 5.795831649E−06 | 1.120146020E−07 |
| A30 = | −3.682321712E−05 | 4.902309544E−06 | −1.244639628E−07 | −2.173649136E−09 |

In Table 1A, the curvature radius, the thickness and the focal length are shown in millimeters (mm). Surface numbers 0-17 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
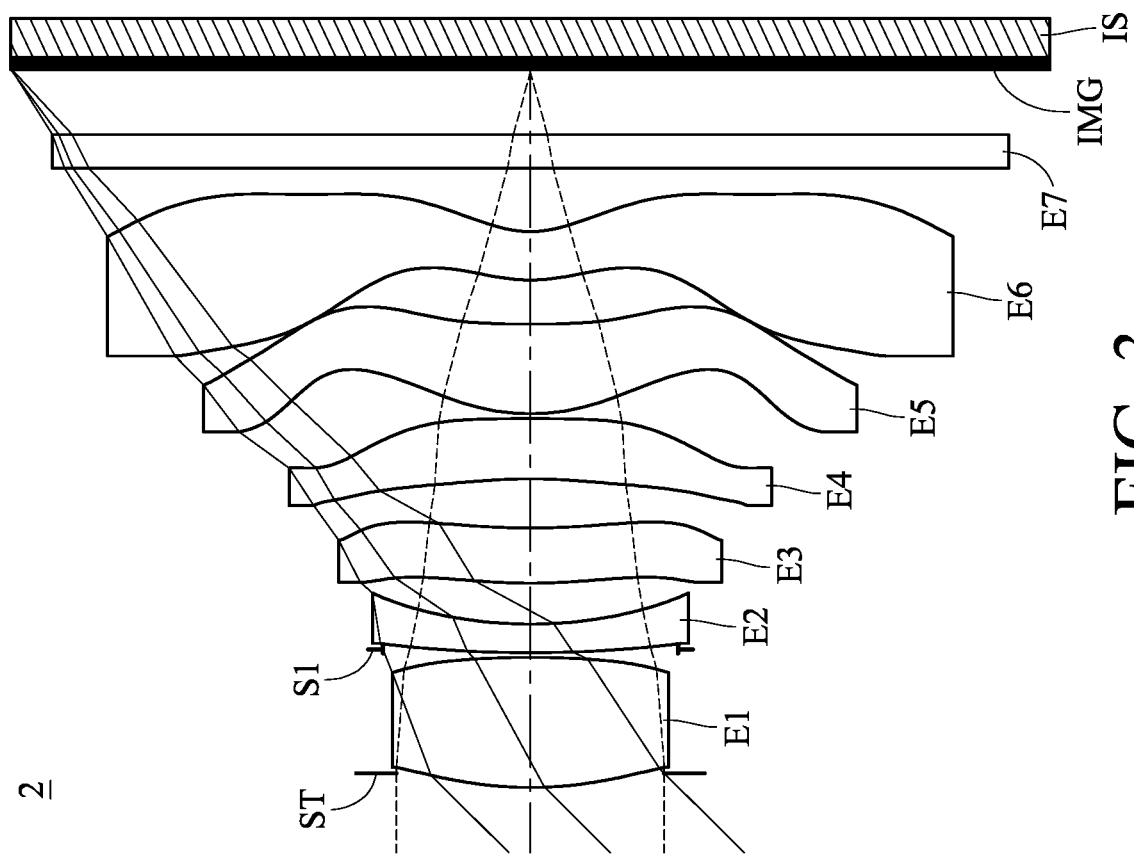
FIG. 3 is a schematic view of an image capturing unit according to the 2nd embodiment of the present disclosure.
Figure 4:
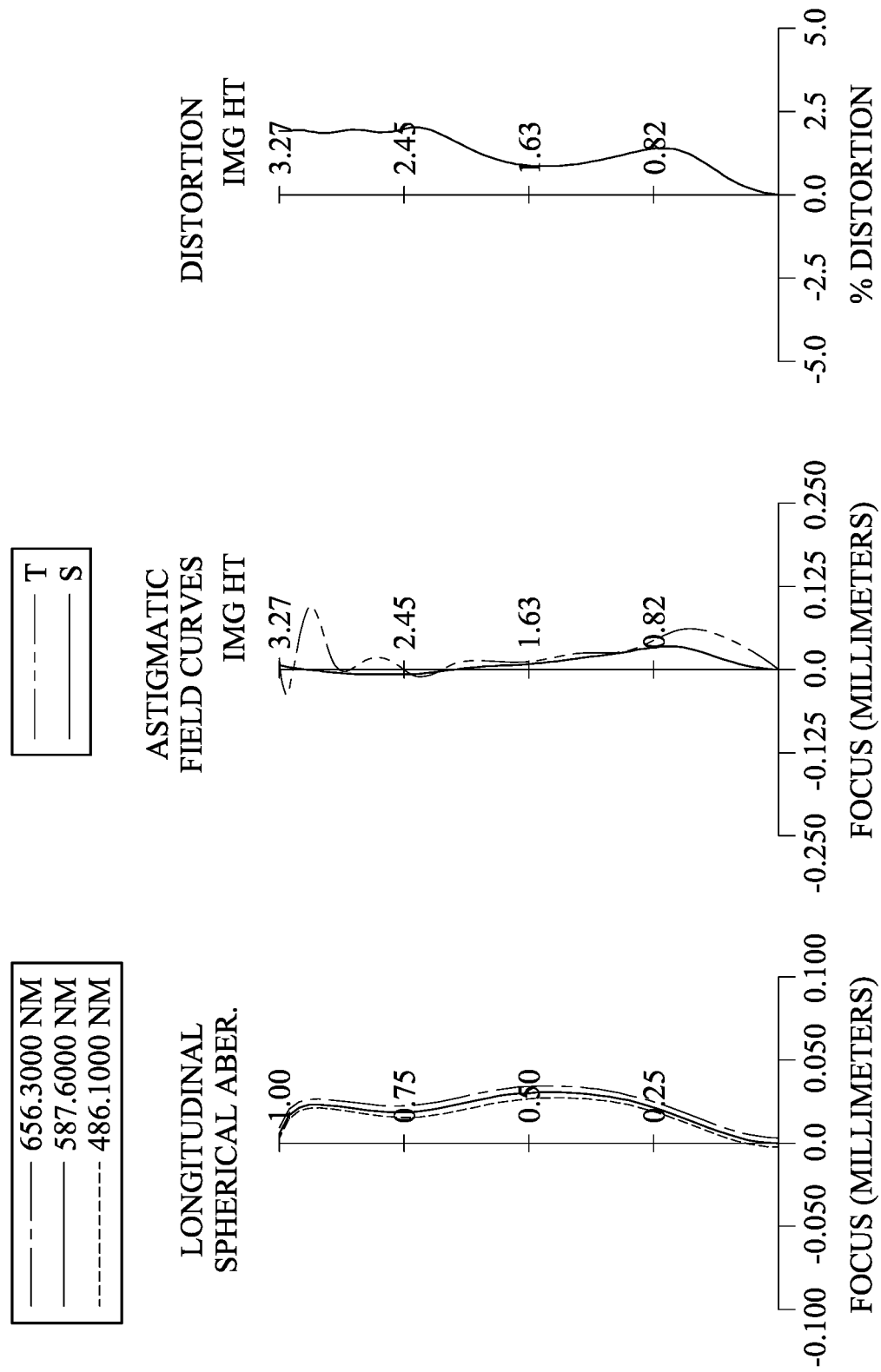
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging system lens assembly (its reference numeral is omitted) of the present disclosure and an image sensor IS. The imaging system lens assembly includes, in order from an object side to an image side along an optical axis, an aperture stop ST, a first lens element E1, a stop S1, a second lens element E2, a third lens element E3, a fourth lens element E4, a fifth lens element E5, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has two critical points in an off-axis region thereof. The image-side surface of the third lens element E3 has one critical point in an off-axis region thereof.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The image-side surface of the fourth lens element E4 has two critical points in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has five inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has four inflection points. The object-side surface of the sixth lens element E6 has one critical point in an off-axis region thereof. The image-side surface of the sixth lens element E6 has three critical points in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The detailed optical data of the 2nd embodiment are shown in Table 2A and the aspheric surface data are shown in Table 2B below.

TABLE 2A

2nd Embodiment
f = 3.17 mm, Fno = 1.88, HFOV = 45.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.089 | | | | |
| 2 | Lens 1 | 2.4040 | (ASP) | 0.820 | Glass | 1.540 | 59.4 | 3.32 |
| 3 | | −6.1944 | (ASP) | 0.049 | | | | |
| 4 | Stop | Plano | | −0.019 | | | | |
| 5 | Lens 2 | 8.4517 | (ASP) | 0.180 | Plastic | 1.669 | 19.5 | −6.09 |
| 6 | | 2.7248 | (ASP) | 0.258 | | | | |
| 7 | Lens 3 | 3.6233 | (ASP) | 0.348 | Plastic | 1.562 | 44.6 | 21.19 |
| 8 | | 5.0287 | (ASP) | 0.310 | | | | |
| 9 | Lens 4 | −3.1300 | (ASP) | 0.380 | Plastic | 1.545 | 56.1 | −7.81 |
| 10 | | −12.3552 | (ASP) | 0.030 | | | | |
| 11 | Lens 5 | 1.3722 | (ASP) | 0.565 | Plastic | 1.544 | 56.0 | 2.90 |
| 12 | | 8.9628 | (ASP) | 0.278 | | | | |
| 13 | Lens 6 | 1.0274 | (ASP) | 0.306 | Plastic | 1.544 | 56.0 | −4.92 |
| 14 | | 0.6644 | (ASP) | 0.400 | | | | |
| 15 | Filter | Plano | | 0.210 | Glass | 1.517 | 64.2 | — |
| 16 | | Plano | | 0.409 | | | | |
| 17 | Image | Plano | | — | | | | |

Note:
Reference wavelength is 587.6 nm (d-line).
An effective radius of the stop S1 (Surface 4) is 0.929 mm.

TABLE 2B

Aspheric Coefficients

| Surface # | 2 | 3 | 5 | 6 |
|---|---|---|---|---|
| k = | 2.254350000E−01 | −2.608770000E+01 | 2.935700000E+01 | −1.888810000E+01 |
| A4 = | −5.016176837E−02 | −8.868929215E−02 | −4.770895877E−02 | 5.258689967E−02 |
| A6 = | 2.118937700E−01 | 5.238893985E−01 | 5.595430395E−01 | 2.159856923E−01 |
| A8 = | −1.473276979E+00 | −2.535904104E+00 | −2.118557252E+00 | −5.885284464E−01 |
| A10 = | 5.437580169E+00 | 5.597199938E+00 | 3.763926949E+00 | 5.983469005E−01 |
| A12 = | −1.222400623E+01 | −6.668696166E+00 | −3.509226369E+00 | −1.519277175E−01 |
| A14 = | 1.633419021E+01 | 4.187440347E+00 | 1.676770362E+00 | −1.222498544E−01 |
| A16 = | −1.197215721E+01 | −1.093457504E+00 | −3.241215495E−01 | 6.601175170E−02 |
| A18 = | 3.709243305E+00 | — | — | — |

| Surface # | 7 | 8 | 9 | 10 |
|---|---|---|---|---|
| k = | 3.274220000E+00 | 5.437810000E+00 | −1.889890000E+01 | −9.255530000E+00 |
| A4 = | −1.272426694E−01 | 5.824590753E−02 | 1.637511273E−03 | −8.281970722E−02 |
| A6 = | −1.810449994E−01 | −6.529461591E−01 | 2.275343327E+00 | 1.092452398E+00 |
| A8 = | 1.069635693E+00 | 1.862917974E+00 | −1.668994701E+01 | −9.979465708E+00 |
| A10 = | −3.267190512E+00 | −3.635750309E+00 | 6.700324041E+01 | 3.686465671E+01 |
| A12 = | 5.823210201E+00 | 4.606469663E+00 | −1.779179187E+02 | −8.098878294E+01 |
| A14 = | −6.101973196E+00 | −3.731605757E+00 | 3.326086700E+02 | 1.191635643E+02 |
| A16 = | 3.411952810E+00 | 1.823676599E+00 | −4.506085098E+02 | −1.231644630E+02 |
| A18 = | −7.682843780E−01 | −4.820575967E−01 | 4.478124371E+02 | 9.111440997E+01 |
| A20 = | — | 5.346315460E−02 | −3.264193296E+02 | −4.833625425E+01 |
| A22 = | — | — | 1.723693734E+02 | 1.817142797E+01 |
| A24 = | — | — | −6.409544140E+01 | −4.706259080E+00 |
| A26 = | — | — | 1.589241204E+01 | 7.950420344E−01 |
| A28 = | — | — | −2.354757217E+00 | −7.845030368E−02 |
| A30 = | — | — | 1.574369118E−01 | 3.407411245E−03 |

TABLE 2B-continued

Aspheric Coefficients

| Surface # | 11 | 12 | 13 | 14 |
|---|---|---|---|---|
| k = | −9.948360000E−01 | −2.716780000E+00 | −4.172160000E+00 | −1.131360000E+00 |
| A4 = | 1.173889825E−01 | 8.761539939E−02 | −6.960853792E−01 | −1.198394569E+00 |
| A6 = | −2.976783232E−01 | 1.181045814E+00 | 7.638154246E−01 | 1.653895477E+00 |
| A8 = | −1.067626749E+00 | −4.864929521E+00 | −8.717642749E−01 | −1.831797611E+00 |
| A10 = | 4.879892238E+00 | 9.641241372E+00 | 7.291359766E−01 | 1.533594817E+00 |
| A12 = | −9.889267074E+00 | −1.249120662E+01 | −3.445670375E−01 | −9.318123950E−01 |
| A14 = | 1.255099911E+01 | 1.140619513E+01 | 5.575366815E−02 | 4.105898592E−01 |
| A16 = | −1.082843317E+01 | −7.531192353E+00 | 3.389528463E−02 | −1.322712209E−01 |
| A18 = | 6.543777008E+00 | 3.623780361E+00 | −2.720329253E−02 | 3.127635305E−02 |
| A20 = | −2.797282557E+00 | −1.267061747E+00 | 9.830939705E−03 | −5.406370125E−03 |
| A22 = | 8.420252555E−01 | 3.176794222E−01 | −2.216234045E−03 | 6.733344785E−04 |
| A24 = | −1.746839112E−01 | −5.554308793E−02 | 3.285302729E−04 | −5.866144415E−05 |
| A26 = | 2.379226857E−02 | 6.421682366E−03 | −3.134249839E−05 | 3.382697870E−06 |
| A28 = | −1.916510541E−03 | −4.408247124E−04 | 1.754897781E−06 | −1.156258336E−07 |
| A30 = | 6.924732452E−05 | 1.359551673E−05 | −4.402376675E−08 | 1.767188567E−09 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| f [mm] | 3.17 | f1234/f56 | 2.04 |
|---|---|---|---|
| Fno | 1.88 | f4/f1 | −2.35 |
| HFOV [deg.] | 45.2 | f5/f6 | −0.59 |
| FOV [deg.] | 90.4 | CT1/CT2 | 4.56 |
| (R1 + R12)/(R1 − R12) | 1.76 | CT1/max(CT2 − 6) | 1.45 |
| (R11 + R12)/(R11 − R12) | 4.66 | (T12 + T45)/T56 | 0.22 |
| (R5 + R6)/(R5 − R6) | −6.16 | T45/ΣAT | 0.03 |
| (R7 + R8)/(R7 − R8) | −1.68 | SD/TD | 0.97 |
| R11/R10 | 0.11 | EPD/BL | 1.65 |
| (V2 + V3)/V4 | 1.14 | ET1/CT1 | 0.73 |
| V3/V4 | 0.80 | TL/ImgH | 1.38 |
| (\|f/f1\| + \|f/f6\|)/(\|f/f2\| + \|f/f3\| + \|f/f4\| + \|f/f5\|) | 0.74 | Y1R1/ET1 | 1.42 |
|  |  | Y1R1/ImgH | 0.26 |
| f/fair45 | 0.90 |  |  |

3rd Embodiment

Figure 5:
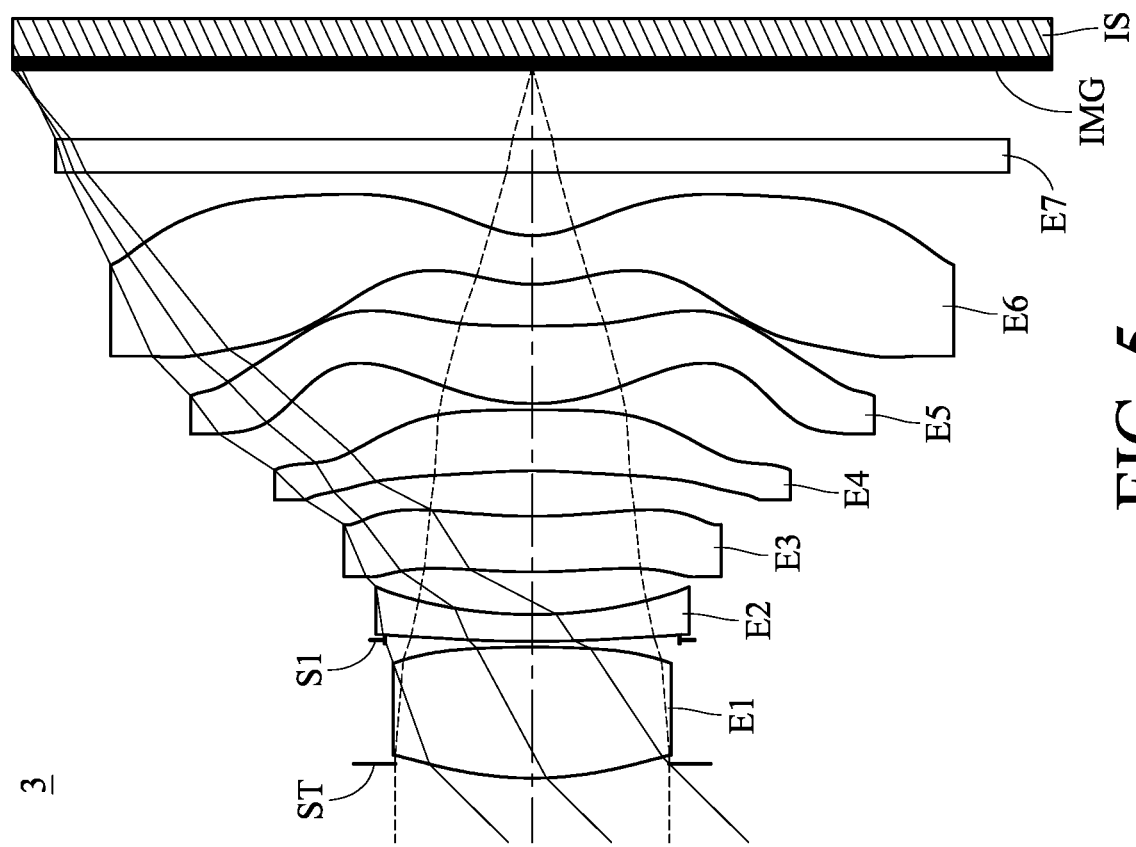
FIG. 5 is a schematic view of an image capturing unit according to the 3rd embodiment of the present disclosure.
Figure 6:
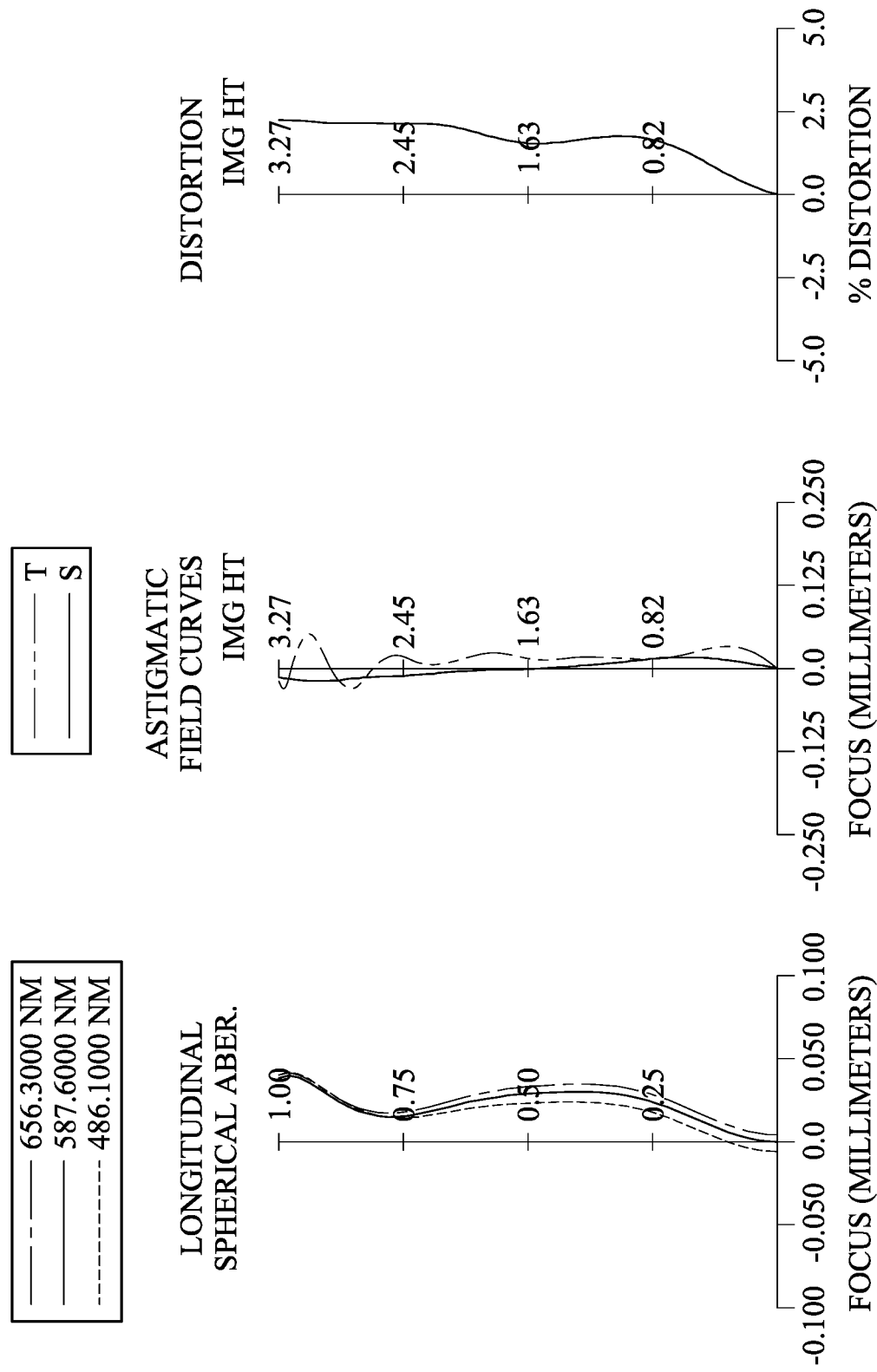
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging system lens assembly (its reference numeral is omitted) of the present disclosure and an image sensor IS. The imaging system lens assembly includes, in order from an object side to an image side along an optical axis, an aperture stop ST, a first lens element E1, a stop S1, a second lens element E2, a third lens element E3, a fourth lens element E4, a fifth lens element E5, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has two critical points in an off-axis region thereof. The image-side surface of the third lens element E3 has two critical points in an off-axis region thereof.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has four inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has five inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has two inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The detailed optical data of the 3rd embodiment are shown in Table 3A and the aspheric surface data are shown in Table 3B below.

TABLE 3A

3rd Embodiment
f = 3.18 mm, Fno = 1.83, HFOV = 45.0 deg.

| Surface # |           | Curvature Radius | Thickness | Material | Index | Abbe # | Focal Length |
|-----------|-----------|------------------|-----------|----------|-------|--------|--------------|
| 0         | Object    | Plano            | Infinity  |          |       |        |              |
| 1         | Ape. Stop | Plano            | −0.091    |          |       |        |              |
| 2         | Lens 1    | 2.2509 (ASP)     | 0.831     | Plastic  | 1.545 | 56.1   | 3.29         |
| 3         |           | −7.6626 (ASP)    | 0.046     |          |       |        |              |
| 4         | Stop      | Plano            | −0.009    |          |       |        |              |
| 5         | Lens 2    | 9.2421 (ASP)     | 0.170     | Plastic  | 1.686 | 18.4   | −6.92        |
| 6         |           | 3.1137 (ASP)     | 0.270     |          |       |        |              |
| 7         | Lens 3    | 4.0520 (ASP)     | 0.353     | Plastic  | 1.566 | 37.4   | 3660.26      |
| 8         |           | 3.9320 (ASP)     | 0.288     |          |       |        |              |
| 9         | Lens 4    | −3.5467 (ASP)    | 0.387     | Plastic  | 1.544 | 56.0   | −10.66       |
| 10        |           | −9.4885 (ASP)    | 0.040     |          |       |        |              |
| 11        | Lens 5    | 1.4408 (ASP)     | 0.491     | Plastic  | 1.544 | 56.0   | 2.98         |
| 12        |           | 11.2729 (ASP)    | 0.265     |          |       |        |              |
| 13        | Lens 6    | 0.9641 (ASP)     | 0.308     | Plastic  | 1.534 | 56.0   | −5.05        |
| 14        |           | 0.6313 (ASP)     | 0.400     |          |       |        |              |
| 15        | Filter    | Plano            | 0.210     | Glass    | 1.517 | 64.2   | —            |
| 16        |           | Plano            | 0.441     |          |       |        |              |
| 17        | Image     | Plano            | —         |          |       |        |              |

Note:
Reference wavelength is 587.6 nm (d-line).
An effective radius of the stop S1 (Surface 4) is 0.933 mm.

TABLE 3B

Aspheric Coefficients

| Surface # | 2 | 3 | 5 | 6 |
|---|---|---|---|---|
| k =   | 0.000000000E+00  | 6.877724000E−02  | 9.174842000E+00  | −2.250830000E+01 |
| A4 =  | −5.282924081E−02 | 9.059503856E−03  | 5.821047660E−02  | 8.906432863E−02  |
| A6 =  | 2.537717457E−01  | −3.654705970E−01 | −1.418328427E−01 | 6.285311352E−02  |
| A8 =  | −1.515062464E+00 | 7.074639582E−01  | −5.830205584E−02 | −3.163562398E−01 |
| A10 = | 4.794060127E+00  | −1.322319886E+00 | 9.180060815E−02  | 2.975332478E−01  |
| A12 = | −9.187709466E+00 | 2.129359034E+00  | 4.783582234E−01  | 3.313936822E−02  |
| A14 = | 1.041513806E+01  | −1.920505102E+00 | −7.093148701E−01 | −1.781748537E−01 |
| A16 = | −6.464390256E+00 | 6.810732548E−01  | 2.760065436E−01  | 7.709562247E−02  |
| A18 = | 1.697832236E+00  | —                | —                | —                |

| Surface # | 7 | 8 | 9 | 10 |
|---|---|---|---|---|
| k =   | 1.458656000E+00  | 1.626224000E+00  | −2.135726000E+01 | 0.000000000E+00  |
| A4 =  | −1.406004647E−01 | 2.026255179E−02  | 2.405979733E−01  | 1.471046903E−01  |
| A6 =  | −4.011372770E−01 | −6.445582507E−01 | −9.037273981E−02 | −1.461345489E+00 |
| A8 =  | 2.081023964E+00  | 1.638192643E+00  | −2.321345389E+00 | 3.334903070E+00  |
| A10 = | −6.067751552E+00 | −2.554242252E+00 | 9.212379400E+00  | −4.705102523E+00 |
| A12 = | 1.093550756E+01  | 2.224034242E+00  | −1.860363240E+01 | 4.321194437E+00  |
| A14 = | −1.193969036E+01 | −7.402813547E−01 | 2.240408184E+01  | −1.922353009E+00 |
| A16 = | 7.090139618E+00  | −3.917037037E−01 | −1.528451030E+01 | −9.119219495E−01 |
| A18 = | −1.716657895E+00 | 4.192889231E−01  | 3.148023802E+00  | 2.223768501E+00  |
| A20 = | —                | −1.001167001E−01 | 4.078385904E+00  | −1.799706429E+00 |
| A22 = | —                | —                | −4.295191783E+00 | 8.513813079E−01  |
| A24 = | —                | —                | 2.003121688E+00  | −2.538773841E−01 |
| A26 = | —                | —                | −5.231814820E−01 | 4.705820112E−02  |
| A28 = | —                | —                | 7.400176695E−02  | −4.967107513E−03 |
| A30 = | —                | —                | −4.424117086E−03 | 2.286837663E−04  |

TABLE 3B-continued

| Aspheric Coefficients | | | | |
|---|---|---|---|---|
| Surface # | 11 | 12 | 13 | 14 |
| k = | −1.000000000E+00 | 2.106490000E−01 | −4.140169000E+00 | −1.165772000E+00 |
| A4 = | 1.663538225E−01 | 1.088054148E−01 | −5.626806219E−01 | −1.158458724E+00 |
| A6 = | −9.278031352E−01 | 6.377665913E−01 | 4.728077845E−02 | 1.475796178E+00 |
| A8 = | 2.003028311E+00 | −2.378092021E+00 | 7.919391180E−01 | −1.443403242E+00 |
| A10 = | −3.131130321E+00 | 3.932651858E+00 | −1.487117834E+00 | 1.054077171E+00 |
| A12 = | 3.292320102E+00 | −4.290214607E+00 | 1.548040685E+00 | −5.599983034E−01 |
| A14 = | −2.265990293E+00 | 3.362047527E+00 | −1.039956704E+00 | 2.173436210E−01 |
| A16 = | 9.850599475E−01 | −1.931663032E+00 | 4.765185565E−01 | −6.240817982E−02 |
| A18 = | −2.408212639E−01 | 8.142324546E−01 | −1.533396274E−01 | 1.337906703E−02 |
| A20 = | 1.386860682E−02 | −2.496337916E−01 | 3.507061363E−02 | −2.143427348E−03 |
| A22 = | 1.058281173E−02 | 5.471598863E−02 | −5.680490006E−03 | 2.539691925E−04 |
| A24 = | −3.678935240E−03 | −8.319158139E−03 | 6.376382510E−04 | −2.166944594E−05 |
| A26 = | 5.718016195E−04 | 8.310904215E−04 | −4.722530999E−05 | 1.261583953E−06 |
| A28 = | −4.560478093E−05 | −4.896749014E−05 | 2.077665484E−06 | −4.488640700E−08 |
| A30 = | 1.512185117E−06 | 1.287810780E−06 | −4.116651237E−08 | 7.356297222E−10 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Values of Conditional Expressions | | | |
|---|---|---|---|
| f [mm] | 3.18 | f1234/f56 | 1.82 |
| Fno | 1.83 | f4/f1 | −3.24 |
| HFOV [deg.] | 45.0 | f5/f6 | −0.59 |
| FOV [deg.] | 90.1 | CT1/CT2 | 4.89 |
| (R1 + R12)/(R1 − R12) | 1.78 | CT1/max(CT2 − 6) | 1.69 |
| (R11 + R12)/(R11 − R12) | 4.79 | (T12 + T45)/T56 | 0.29 |
| (R5 + R6)/(R5 − R6) | 66.55 | T45/ΣAT | 0.04 |
| (R7 + R8)/(R7 − R8) | −2.19 | SD/TD | 0.97 |
| R11/R10 | 0.09 | EPD/BL | 1.65 |
| (V2 + V3)/V4 | 1.00 | ET1/CT1 | 0.70 |
| V3/V4 | 0.67 | TL/ImgH | 1.37 |
| (|f/f1| + |f/f6|)/(|f/f2| + |f/f3| + |f/f4| + |f/f5|) | 0.87 | Y1R1/ET1 | 1.49 |
| | | Y1R1/ImgH | 0.27 |
| f/fair45 | 0.89 | | |

4th Embodiment

Figure 7:
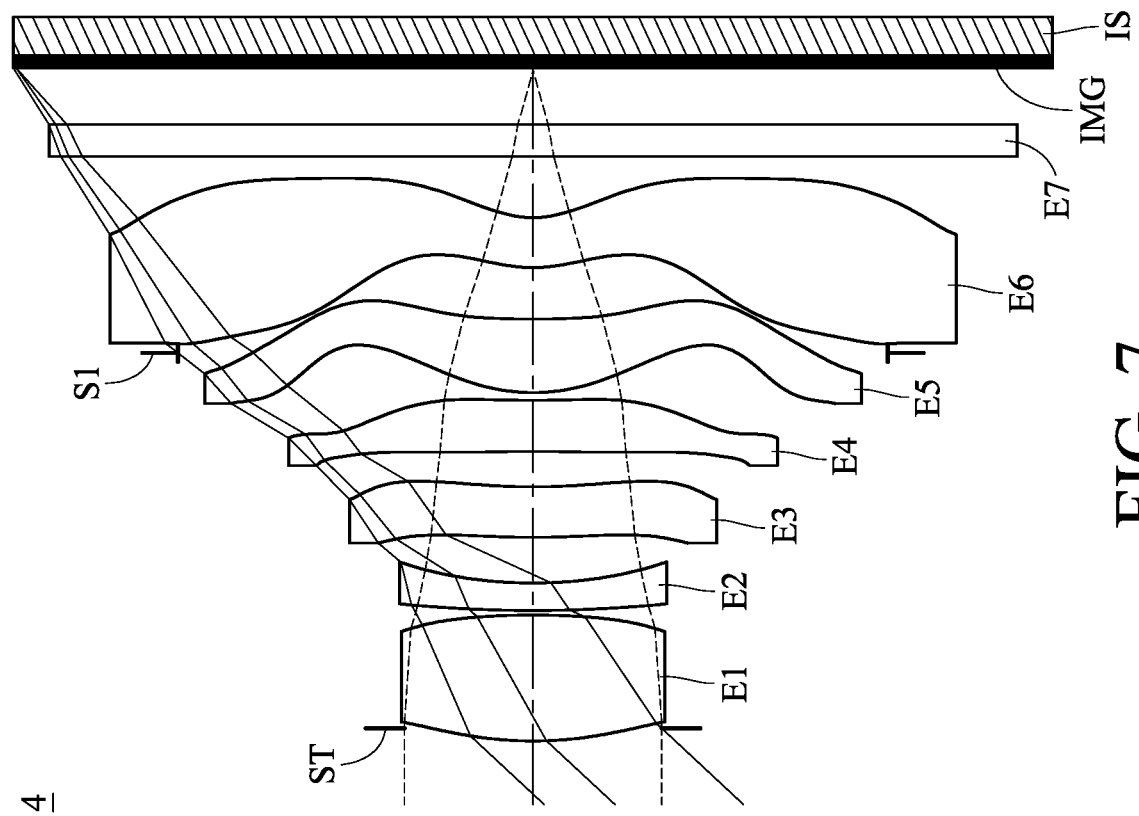
FIG. 7 is a schematic view of an image capturing unit according to the 4th embodiment of the present disclosure.
Figure 8:
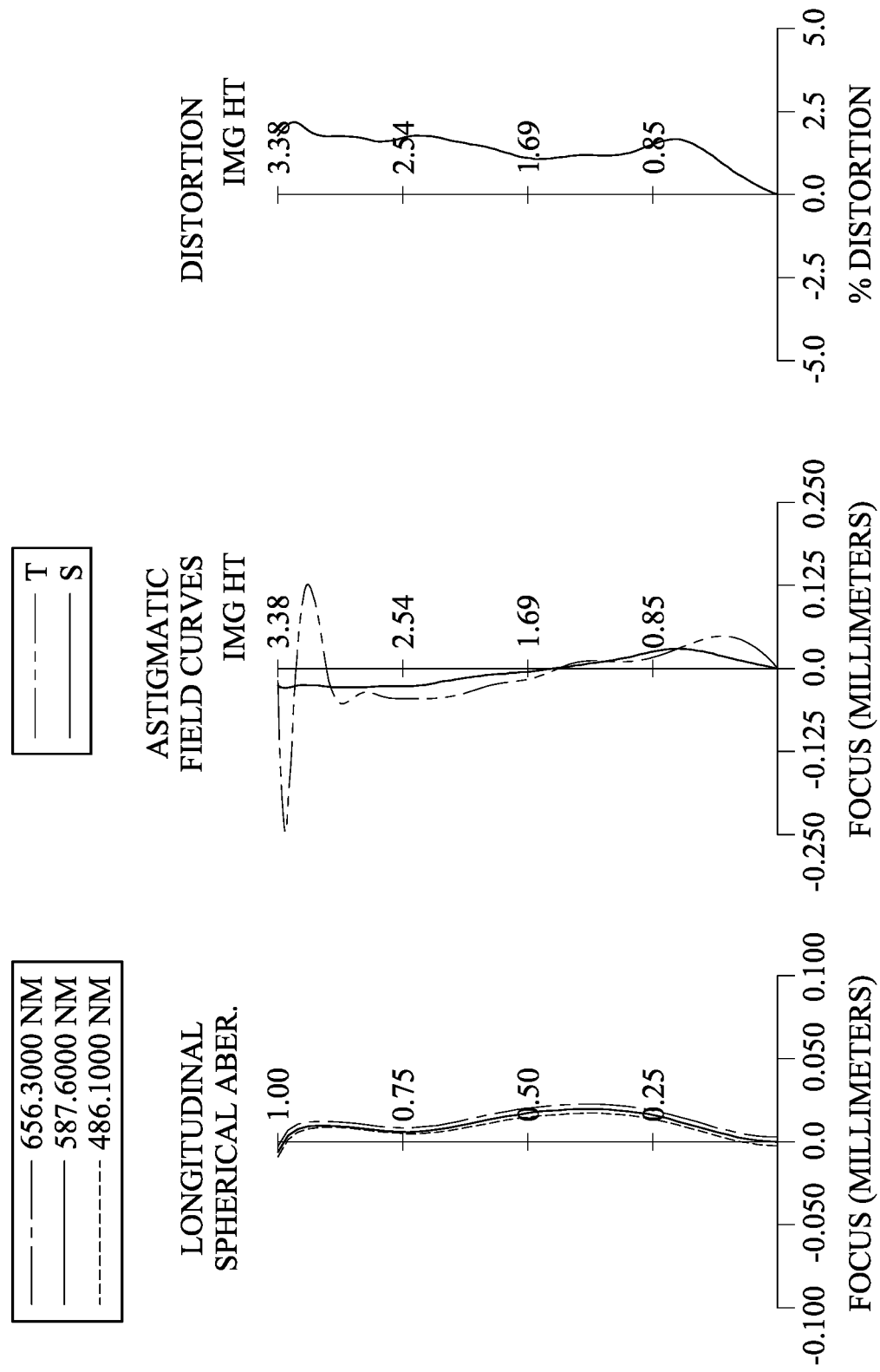
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging system lens assembly (its reference numeral is omitted) of the present disclosure and an image sensor IS. The imaging system lens assembly includes, in order from an object side to an image side along an optical axis, an aperture stop ST, a first lens element E1, a second lens element E2, a third lens element E3, a fourth lens element E4, a fifth lens element E5, a stop S1, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one critical point in an off-axis region thereof. The image-side surface of the third lens element E3 has one critical point in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has three inflection points. The object-side surface of the fourth lens element E4 has two critical points in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has five inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has four inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The detailed optical data of the 4th embodiment are shown in Table 4A and the aspheric surface data are shown in Table 4B below.

TABLE 4A

4th Embodiment
f = 3.10 mm, Fno = 1.84, HFOV = 47.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.084 | | | | |
| 2 | Lens 1 | 2.4252 (ASP) | 0.825 | Plastic | 1.544 | 56.0 | 3.21 |
| 3 | | −5.4875 (ASP) | 0.030 | | | | |
| 4 | Lens 2 | 9.3129 (ASP) | 0.180 | Plastic | 1.686 | 18.4 | −6.77 |
| 5 | | 3.0750 (ASP) | 0.299 | | | | |
| 6 | Lens 3 | 5.2924 (ASP) | 0.331 | Plastic | 1.566 | 37.4 | −44.28 |
| 7 | | 4.2709 (ASP) | 0.232 | | | | |
| 8 | Lens 4 | −9.3527 (ASP) | 0.335 | Plastic | 1.562 | 44.6 | −8.45 |
| 9 | | 9.7763 (ASP) | 0.050 | | | | |
| 10 | Lens 5 | 1.2825 (ASP) | 0.482 | Plastic | 1.544 | 56.0 | 2.75 |
| 11 | | 7.7464 (ASP) | −0.223 | | | | |
| 12 | Stop | Plano | 0.560 | | | | |
| 13 | Lens 6 | 0.9580 (ASP) | 0.327 | Plastic | 1.544 | 56.0 | −5.67 |
| 14 | | 0.6431 (ASP) | 0.400 | | | | |
| 15 | Filter | Plano | 0.210 | Glass | 1.517 | 64.2 | — |
| 16 | | Plano | 0.369 | | | | |
| 17 | Image | Plano | — | | | | |

Note:
Reference wavelength is 587.6 nm (d-line).
An effective radius of the stop S1 (Surface 12) is 2.322 mm.

TABLE 4B

Aspheric Coefficients

| Surface # | 2 | 3 | 4 | 5 |
|---|---|---|---|---|
| k = | −9.501030000E−02 | −2.789430000E+00 | 3.850430000E+01 | −1.794310000E+01 |
| A4 = | −5.551093975E−02 | −6.347912952E−02 | 3.344780511E−02 | 9.711604796E−02 |
| A6 = | 2.334142992E−01 | 2.594540795E−01 | 2.266670292E−02 | −5.911383906E−03 |
| A8 = | −1.511139340E+00 | −1.878141820E+00 | −7.163256327E−01 | −1.773628235E−01 |
| A10 = | 5.393240291E+00 | 5.163851991E+00 | 1.867393580E+00 | 2.507497428E−01 |
| A12 = | −1.205917187E+01 | −7.275190677E+00 | −2.108358658E+00 | −6.050613144E−02 |
| A14 = | 1.624944083E+01 | 5.266351323E+00 | 1.172138474E+00 | −6.527805888E−02 |
| A16 = | −1.208733351E+01 | −1.559533386E+00 | −2.667923476E−01 | 3.309487636E−02 |
| A18 = | 3.808018082E+00 | — | — | — |

| Surface # | 6 | 7 | 8 | 9 |
|---|---|---|---|---|
| k = | 8.554190000E+00 | 2.350730000E+00 | −2.182420000E+01 | −9.652000000E+01 |
| A4 = | −1.425158054E−01 | 1.714046098E−03 | 5.290086937E−02 | −1.554988358E−02 |
| A6 = | −2.004585190E−01 | −6.117799778E−01 | 1.741742457E+00 | −2.448784351E−01 |
| A8 = | 1.289242483E+00 | 1.950635368E+00 | −1.406181427E+01 | −3.133257345E+00 |
| A10 = | −3.797711494E+00 | −4.002214361E+00 | 5.866532010E+01 | 1.634352786E+01 |
| A12 = | 6.463970903E+00 | 5.326869040E+00 | −1.581334832E+02 | −3.935961541E+01 |
| A14 = | −6.497131735E+00 | −4.615311972E+00 | 2.962212135E+02 | 5.926195717E+01 |
| A16 = | 3.521920308E+00 | 2.494391425E+00 | −3.990662547E+02 | −6.098624226E+01 |
| A18 = | −7.754458086E−01 | −7.652635127E−01 | 3.925387171E+02 | 4.441027401E+01 |
| A20 = | — | 1.035487269E−01 | −2.823770715E+02 | −2.311076566E+01 |
| A22 = | — | — | 1.468843528E+02 | 8.533077063E+00 |
| A24 = | — | — | −5.374693081E+01 | −2.180200660E+00 |
| A26 = | — | — | 1.311015788E+01 | 3.659239106E−01 |
| A28 = | — | — | −1.911967010E+00 | −3.622339679E−02 |
| A30 = | — | — | 1.259941286E−01 | 1.598724749E−03 |

TABLE 4B-continued

Aspheric Coefficients

| Surface # | 10 | 11 | 13 | 14 |
|---|---|---|---|---|
| k = | −1.010910000E+00 | 4.824120000E−01 | −4.450580000E+00 | −1.142890000E+00 |
| A4 = | 1.888153235E−01 | 6.070412833E−02 | −5.806485596E−01 | −1.133497621E+00 |
| A6 = | −1.023787063E+00 | 1.136816583E+00 | 1.014969557E−01 | 1.270802022E+00 |
| A8 = | 2.185064479E+00 | −4.323742940E+00 | 8.010039940E−01 | −9.344110154E−01 |
| A10 = | −3.575168322E+00 | 8.006784070E+00 | −1.717483784E+00 | 3.901345528E−01 |
| A12 = | 4.465520661E+00 | −9.618787804E+00 | 1.958936549E+00 | −2.092350747E−02 |
| A14 = | −4.228048964E+00 | 8.070442202E+00 | −1.420814417E+00 | −7.723549040E−02 |
| A16 = | 3.014734217E+00 | −4.864938394E+00 | 6.993324142E−01 | 5.042276760E−02 |
| A18 = | −1.611368598E+00 | 2.130530313E+00 | −2.415854784E−01 | −1.752671214E−02 |
| A20 = | 6.394248050E−01 | −6.776409599E−01 | 5.940402299E−02 | 3.944026772E−03 |
| A22 = | −1.846189101E−01 | 1.547118556E−01 | −1.036976057E−02 | −6.013450606E−04 |
| A24 = | 3.746266253E−02 | −2.467982222E−02 | 1.257888871E−03 | 6.196081958E−05 |
| A26 = | −5.038643820E−03 | 2.609716358E−03 | −1.009305467E−04 | −4.143927656E−06 |
| A28 = | 4.018581566E−04 | −1.642914881E−04 | 4.820180189E−06 | 1.626793970E−07 |
| A30 = | −1.435273307E−05 | 4.660047475E−06 | −1.037924462E−07 | −2.848645050E−09 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| | | | |
|---|---|---|---|
| f [mm] | 3.10 | f1234/f56 | 2.95 |
| Fno | 1.84 | f4/f1 | −2.63 |
| HFOV [deg.] | 47.0 | f5/f6 | −0.49 |
| FOV [deg.] | 93.9 | CT1/CT2 | 4.58 |
| (R1 + R12)/(R1 − R12) | 1.72 | CT1/max(CT2 − 6) | 1.71 |
| (R11 + R12)/(R11 − R12) | 5.08 | (T12 + T45)/T56 | 0.24 |
| (R5 + R6)/(R5 − R6) | 9.36 | T45/ΣAT | 0.05 |
| (R7 + R8)/(R7 − R8) | −0.02 | SD/TD | 0.98 |
| R11/R10 | 0.12 | EPD/BL | 1.72 |
| (V2 + V3)/V4 | 1.25 | ET1/CT1 | 0.72 |
| V3/V4 | 0.84 | TL/ImgH | 1.30 |
| (\|f/f1\| + \|f/f6\|)/(\|f/f2\| + \|f/f3\| + \|f/f4\| + \|f/f5\|) | 0.75 | Y1R1/ET1 | 1.42 |
| f/fair45 | 0.74 | Y1R1/ImgH | 0.25 |

5th Embodiment

Figure 9:
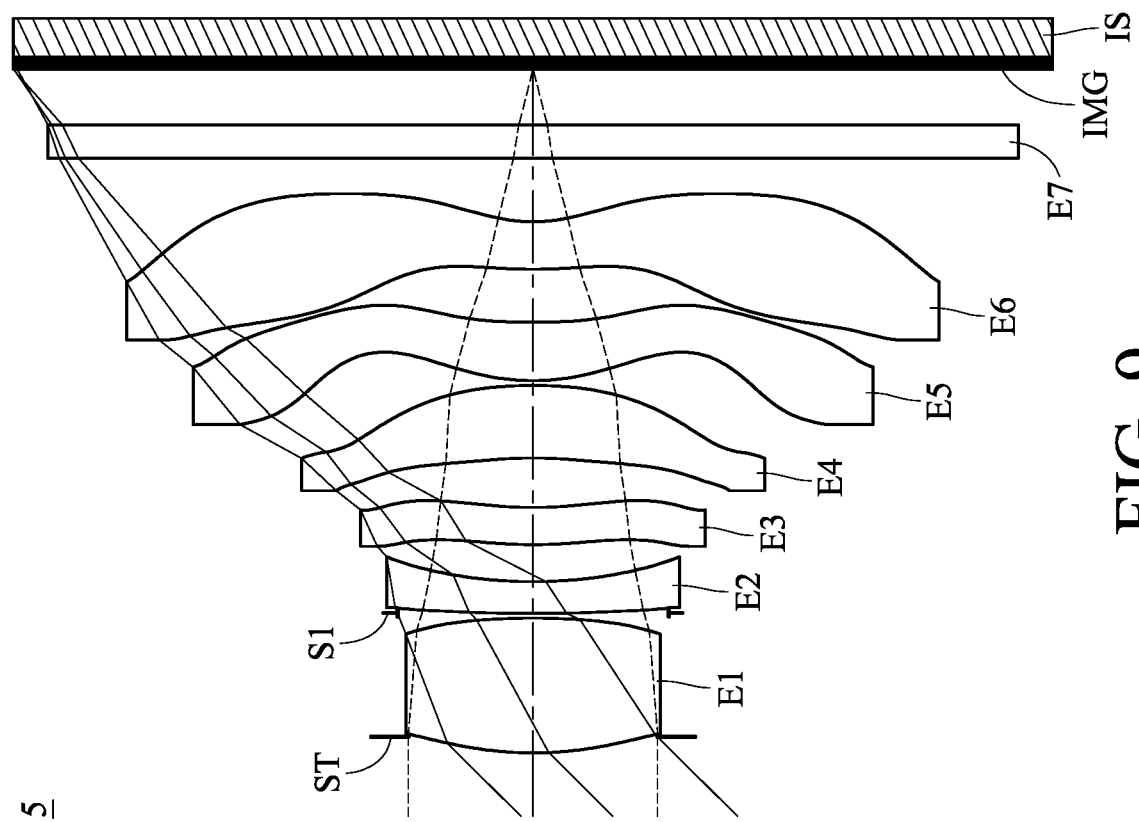
FIG. 9 is a schematic view of an image capturing unit according to the 5th embodiment of the present disclosure.
Figure 10:
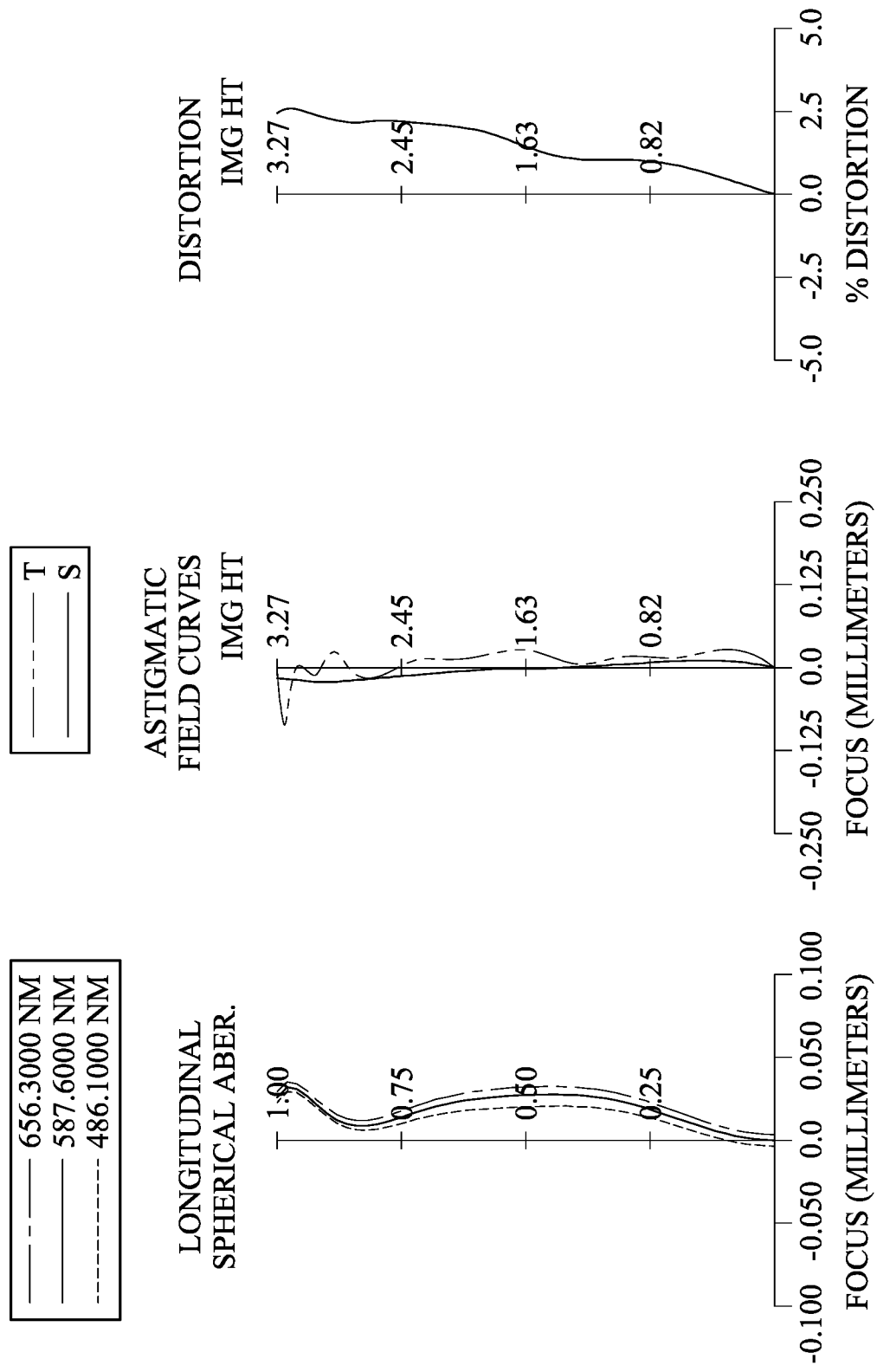
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging system lens assembly (its reference numeral is omitted) of the present disclosure and an image sensor IS. The imaging system lens assembly includes, in order from an object side to an image side along an optical axis, an aperture stop ST, a first lens element E1, a stop S1, a second lens element E2, a third lens element E3, a fourth lens element E4, a fifth lens element E5, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has two critical points in an off-axis region thereof. The image-side surface of the third lens element E3 has two critical points in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has two inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The detailed optical data of the 5th embodiment are shown in Table 5A and the aspheric surface data are shown in Table 5B below.

TABLE 5A

5th Embodiment
f = 3.17 mm, Fno = 2.02, HFOV = 45.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.101 | | | | |
| 2 | Lens 1 | 2.2395 (ASP) | 0.850 | Plastic | 1.545 | 56.1 | 2.84 |
| 3 | | −4.3261 (ASP) | 0.032 | | | | |
| 4 | Stop | Plano | −0.002 | | | | |
| 5 | Lens 2 | 18.5360 (ASP) | 0.200 | Plastic | 1.669 | 19.5 | −5.41 |
| 6 | | 3.0143 (ASP) | 0.233 | | | | |
| 7 | Lens 3 | 2.6438 (ASP) | 0.235 | Plastic | 1.566 | 37.4 | 106.17 |
| 8 | | 2.6766 (ASP) | 0.312 | | | | |
| 9 | Lens 4 | −2.8277 (ASP) | 0.458 | Plastic | 1.544 | 56.0 | 95.44 |
| 10 | | −2.8347 (ASP) | 0.030 | | | | |
| 11 | Lens 5 | 1.4544 (ASP) | 0.369 | Plastic | 1.544 | 56.0 | 3.20 |
| 12 | | 7.9876 (ASP) | 0.333 | | | | |
| 13 | Lens 6 | 2.9760 (ASP) | 0.300 | Plastic | 1.534 | 56.0 | −2.77 |
| 14 | | 0.9534 (ASP) | 0.400 | | | | |
| 15 | Filter | Plano | 0.210 | Glass | 1.517 | 64.2 | — |
| 16 | | Plano | 0.349 | | | | |
| 17 | Image | Plano | — | | | | |

Note:
Reference wavelength is 587.6 nm (d-line).
An effective radius of the stop S1 (Surface 4) is 0.855 mm.

TABLE 5B

Aspheric Coefficients

| Surface # | 2 | 3 | 5 | 6 |
|---|---|---|---|---|
| k = | 2.474150000E+00 | −9.809890000E+01 | −5.610730000E+01 | −2.144890000E+01 |
| A4 = | −8.171961903E−02 | −2.307386721E−02 | 1.790521523E−01 | 6.600904259E−02 |
| A6 = | 1.167840032E−01 | −4.264888290E−01 | −4.450837362E−01 | 3.331864974E−01 |
| A8 = | −6.107815590E−01 | −5.485794692E−02 | −3.816815730E−01 | −1.471253129E+00 |
| A10 = | 9.529908578E−01 | 2.399750283E+00 | 2.713932630E+00 | 2.605765668E+00 |
| A12 = | −1.065875322E−01 | −3.843312491E+00 | −3.414207928E+00 | −2.151941608E+00 |
| A14 = | −1.399079726E+00 | 2.047613454E+00 | 1.405759461E+00 | 6.983875740E−01 |
| A16 = | 1.096029509E+00 | −1.681143120E−01 | — | — |

| Surface # | 7 | 8 | 9 | 10 |
|---|---|---|---|---|
| k = | −9.969580000E+00 | 2.227380000E−01 | −3.558660000E+00 | −4.740220000E−01 |
| A4 = | −2.480088788E−01 | −1.265850866E−01 | 2.309272170E−01 | −2.138873243E−01 |
| A6 = | 1.750415855E−02 | −4.481283040E−01 | 6.765928341E−02 | 1.039513057E−01 |
| A8 = | −2.200209530E−01 | 1.081782736E+00 | −1.464096218E+00 | 1.228665629E+00 |
| A10 = | 1.927469953E+00 | −1.743238791E+00 | 3.101157906E+00 | −5.741224072E+00 |
| A12 = | −4.591828573E+00 | 2.274706504E+00 | −3.172278354E+00 | 1.264442741E+01 |
| A14 = | 4.611581282E+00 | −2.399019103E+00 | 1.368739855E+00 | −1.651295765E+01 |
| A16 = | −1.769334001E+00 | 1.570904783E+00 | 1.809962848E−01 | 1.355506262E+01 |
| A18 = | 1.130757559E−01 | −4.165047902E−01 | −3.471881523E−01 | −7.027266720E+00 |
| A20 = | — | — | 8.000141001E−02 | 2.226521730E+00 |
| A22 = | — | — | — | −3.929950521E−01 |
| A24 = | — | — | — | 2.958522507E−02 |

| Surface # | 11 | 12 | 13 | 14 |
|---|---|---|---|---|
| k = | −1.001660000E+00 | −5.884050000E+00 | −1.039960000E+00 | −1.044580000E+00 |
| A4 = | −6.296528009E−03 | 6.650911303E−01 | −3.493608945E−01 | −7.100409988E−01 |
| A6 = | −2.110569992E−01 | −1.531413503E+00 | −2.333100367E−01 | 6.820566361E−01 |

TABLE 5B-continued

| Aspheric Coefficients | | | | |
|---|---|---|---|---|
| A8 = | −1.376128681E−01 | 1.726221845E+00 | 6.089862606E−01 | −5.995812875E−01 |
| A10 = | 4.193824398E−01 | −1.382668885E+00 | −4.968273208E−01 | 5.114976285E−01 |
| A12 = | −3.254034876E−01 | 8.708092859E−01 | 2.792852805E−01 | −3.659223402E−01 |
| A14 = | 8.450142150E−02 | −4.249446831E−01 | −1.428803281E−01 | 1.977706452E−01 |
| A16 = | 2.888896783E−02 | 1.528649736E−01 | 6.656779022E−02 | −7.856350063E−02 |
| A18 = | −2.669208290E−02 | −3.874049077E−02 | −2.464072342E−02 | 2.286685335E−02 |
| A20 = | 7.767899285E−03 | 6.626228197E−03 | 6.652787527E−03 | −4.857479892E−03 |
| A22 = | −1.053114451E−03 | −7.212615377E−04 | −1.264136384E−03 | 7.430676369E−04 |
| A24 = | 5.613753926E−05 | 4.478102549E−05 | 1.643451577E−04 | −7.955403602E−05 |
| A26 = | — | −1.198974605E−06 | −1.392523500E−05 | 5.645987708E−06 |
| A28 = | — | — | 6.935466839E−07 | −2.381902649E−07 |
| A30 = | — | — | −1.541360749E−08 | 4.514561298E−09 |

In the 5th embodiment, the equation of the aspheric surface profiles of the aforementioned lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
|---|---|---|---|
| f [mm] | 3.17 | f1234/f56 | 0.26 |
| Fno | 2.02 | f4/f1 | 33.64 |
| HFOV [deg.] | 45.1 | f5/f6 | −1.16 |
| FOV [deg.] | 90.2 | CT1/CT2 | 4.25 |
| (R1 + R12)/(R1 − R12) | 2.48 | CT1/max(CT2 − 6) | 1.86 |
| (R11 + R12)/(R11 − R12) | 1.94 | (T12 + T45)/T56 | 0.18 |
| (R5 + R6)/(R5 − R6) | −162.21 | T45/ΣAT | 0.03 |
| (R7 + R8)/(R7 − R8) | −808.91 | SD/TD | 0.97 |
| R11/R10 | 0.37 | EPD/BL | 1.64 |
| (V2 + V3)/V4 | 1.02 | ET1/CT1 | 0.74 |
| V3/V4 | 0.67 | TL/ImgH | 1.32 |
| (|f/f1| + |f/f6|)/(|f/f2| + |f/f3| + |f/f4| + |f/f5|) | 1.38 | Y1R1/ET1 | 1.24 |
| | | Y1R1/ImgH | 0.24 |
| f/fair45 | 1.16 | | |

6th Embodiment

Figure 11:
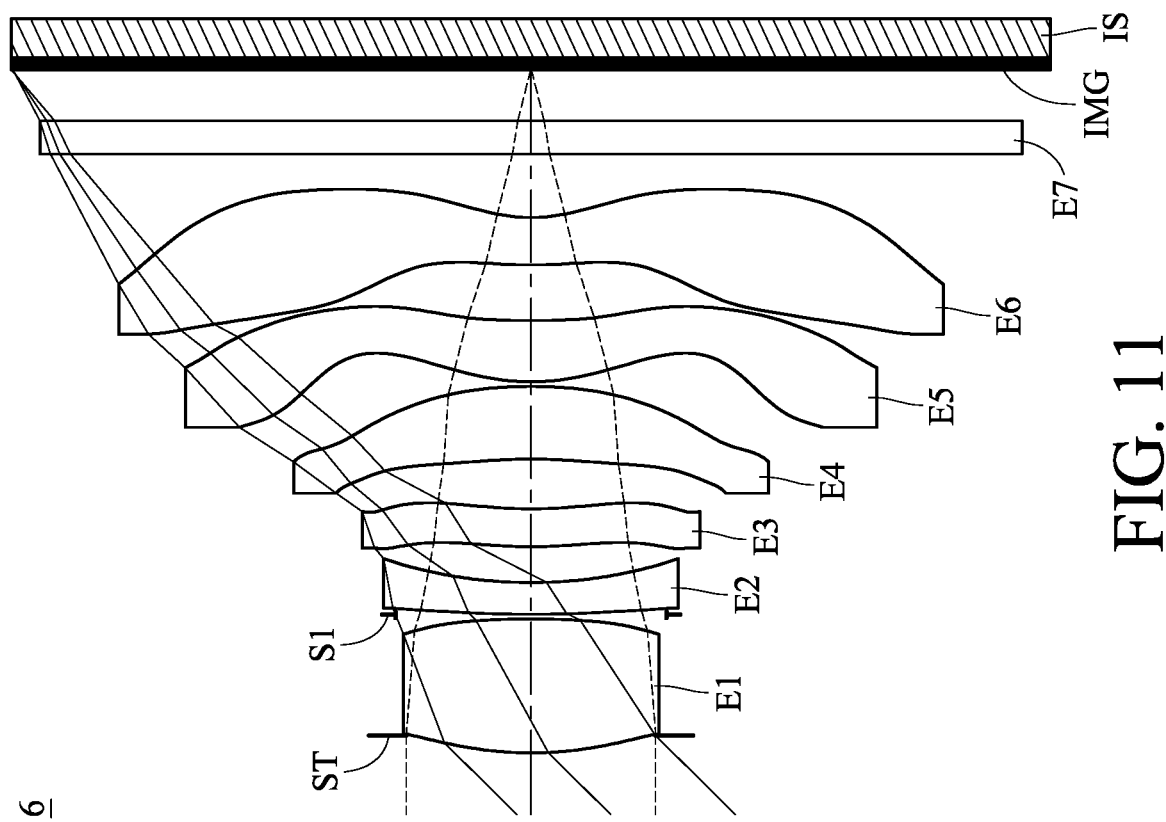
FIG. 11 is a schematic view of an image capturing unit according to the 6th embodiment of the present disclosure.
Figure 12:
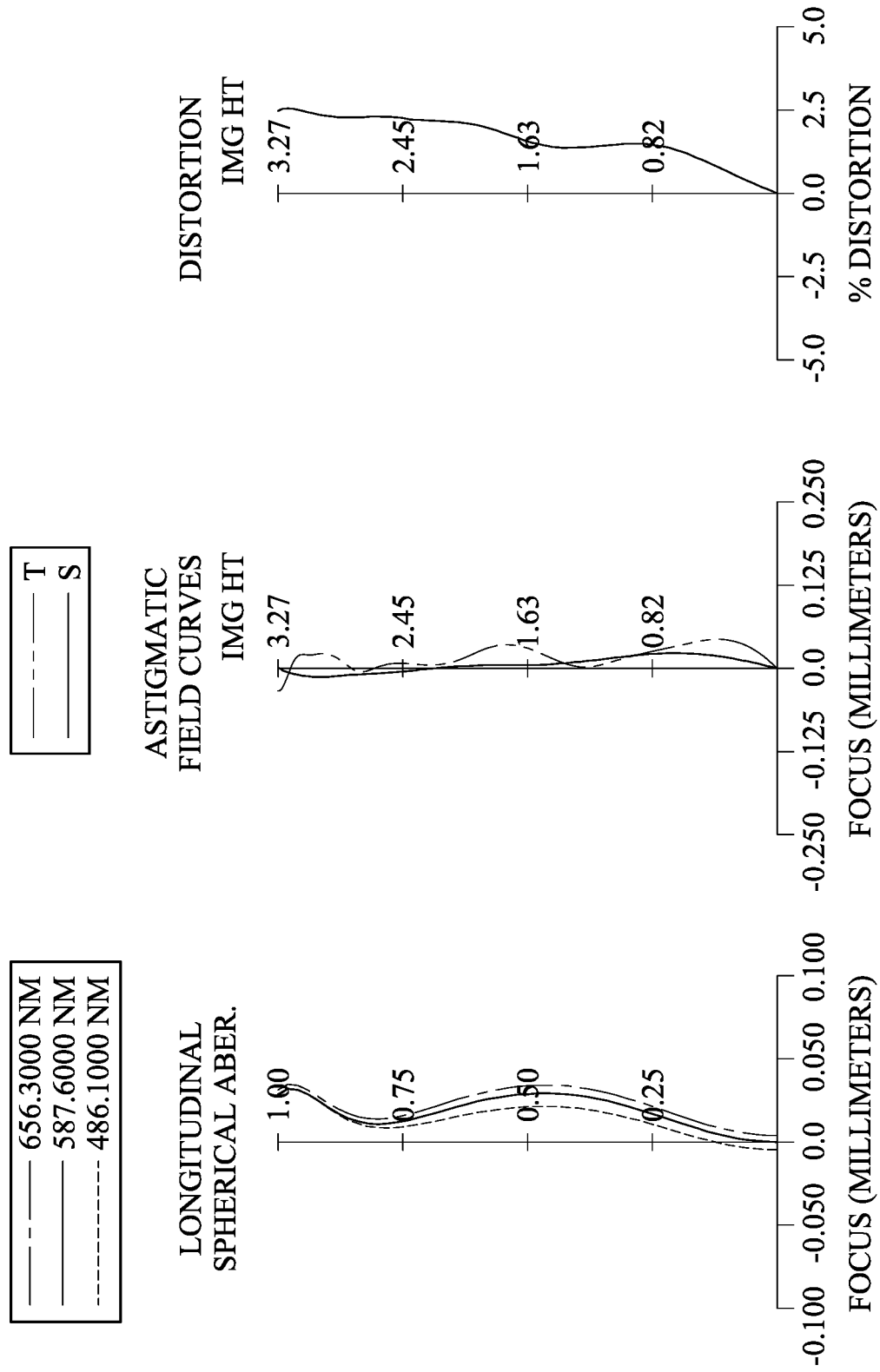
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging system lens assembly (its reference numeral is omitted) of the present disclosure and an image sensor IS. The imaging system lens assembly includes, in order from an object side to an image side along an optical axis, an aperture stop ST, a first lens element E1, a stop S1, a second lens element E2, a third lens element E3, a fourth lens element E4, a fifth lens element E5, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has two critical points in an off-axis region thereof. The image-side surface of the third lens element E3 has two critical points in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has three inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface of the sixth lens element E6 has seven inflection points. The image-side surface of the sixth lens element E6 has two inflection points. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The detailed optical data of the 6th embodiment are shown in Table 6A and the aspheric surface data are shown in Table 6B below.

TABLE 6A

6th Embodiment
f = 3.16 mm, Fno = 2.01, HFOV = 45.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.110 | | | | |
| 2 | Lens 1 | 2.2508 (ASP) | 0.846 | Plastic | 1.545 | 56.1 | 2.98 |
| 3 | | −5.0593 (ASP) | 0.027 | | | | |
| 4 | Stop | Plano | 0.003 | | | | |
| 5 | Lens 2 | 11.7364 (ASP) | 0.200 | Plastic | 1.686 | 18.4 | −6.20 |
| 6 | | 3.0987 (ASP) | 0.226 | | | | |
| 7 | Lens 3 | 2.7881 (ASP) | 0.239 | Plastic | 1.566 | 37.4 | 268.50 |
| 8 | | 2.7522 (ASP) | 0.315 | | | | |
| 9 | Lens 4 | −3.0313 (ASP) | 0.458 | Plastic | 1.544 | 56.0 | 258.07 |
| 10 | | −3.1252 (ASP) | 0.030 | | | | |
| 11 | Lens 5 | 1.4359 (ASP) | 0.386 | Plastic | 1.544 | 56.0 | 3.19 |
| 12 | | 7.5166 (ASP) | 0.352 | | | | |
| 13 | Lens 6 | 3.0442 (ASP) | 0.299 | Plastic | 1.534 | 56.0 | −2.81 |
| 14 | | 0.9713 (ASP) | 0.400 | | | | |
| 15 | Filter | Plano | 0.210 | Glass | 1.517 | 64.2 | — |
| 16 | | Plano | 0.322 | | | | |
| 17 | Image | Plano | — | | | | |

Note:
Reference wavelength is 587.6 nm (d-line).
An effective radius of the stop S1 (Surface 4) is 0.855 mm.

TABLE 6B

Aspheric Coefficients

| Surface # | 2 | 3 | 5 | 6 |
|---|---|---|---|---|
| k = | 2.412970000E+00 | −6.124750000E+01 | 9.843120000E+00 | −2.478430000E+01 |
| A4 = | −6.801238380E−02 | 1.599998903E−02 | 1.610372802E−01 | 9.109997426E−02 |
| A6 = | 1.034917471E−02 | −4.042522709E−01 | −3.586409300E−01 | 2.604032748E−01 |
| A8 = | −1.683153346E−01 | −7.072357881E−01 | −7.074389012E−01 | −1.320998001E+00 |
| A10 = | 1.300223271E−01 | 4.639284038E+00 | 3.264908958E+00 | 2.324007784E+00 |
| A12 = | 3.144445332E−01 | −7.492533842E+00 | −3.886975232E+00 | −1.873867965E+00 |
| A14 = | −8.143317989E−01 | 4.973098752E+00 | 1.550787867E+00 | 5.904026380E−01 |
| A16 = | 4.970780599E−01 | −1.105761293E+00 | — | — |

| Surface # | 7 | 8 | 9 | 10 |
|---|---|---|---|---|
| k = | −1.041600000E+01 | 2.886140000E−01 | −8.197010000E+00 | 6.606410000E−02 |
| A4 = | −3.198459713E−01 | −1.472694602E−01 | 2.922570019E−01 | −1.375739864E−01 |
| A6 = | 4.876458582E−01 | −5.698048447E−01 | −3.957343813E−01 | −2.174816144E−01 |
| A8 = | −2.356496450E+00 | 2.146219075E+00 | 2.169172561E−01 | 2.275876071E+00 |
| A10 = | 8.105555539E+00 | −5.340821773E+00 | −4.185932657E−01 | −7.387438804E+00 |
| A12 = | −1.539544384E+01 | 8.848557058E+00 | 1.300793638E+00 | 1.347738614E+01 |
| A14 = | 1.540762690E+01 | −9.217719507E+00 | −2.041090186E+00 | −1.537160951E+01 |
| A16 = | −7.291000505E+00 | 5.332878922E+00 | 1.598068779E+00 | 1.128398414E+01 |
| A18 = | 1.213164088E+00 | −1.263512332E+00 | −5.922514426E−01 | −5.294853790E+00 |
| A20 = | — | — | 8.005416239E−02 | 1.526513547E+00 |
| A22 = | — | — | — | −2.451799318E−01 |
| A24 = | — | — | — | 1.671102016E−02 |

| Surface # | 11 | 12 | 13 | 14 |
|---|---|---|---|---|
| k = | −1.000000000E+00 | −4.900390000E+00 | −8.908070000E−01 | −1.036690000E+00 |
| A4 = | −1.099352829E−01 | 4.784190741E−01 | −3.855471008E−01 | −6.499478807E−01 |
| A6 = | −8.403205856E−02 | −1.201913928E+00 | −8.101713302E−02 | 5.406596004E−01 |
| A8 = | 4.085670610E−02 | 1.521735779E+00 | 1.557121622E−01 | −3.766966348E−01 |
| A10 = | −5.038708675E−02 | −1.358909980E+00 | 2.371263439E−01 | 2.508554720E−01 |
| A12 = | 9.913050980E−02 | 8.994428013E−01 | −4.246662263E−01 | −1.493919039E−01 |
| A14 = | −1.134838155E−01 | −4.292362664E−01 | 2.984977996E−01 | 7.166040952E−02 |
| A16 = | 7.055242070E−02 | 1.422785909E−01 | −1.254396142E−01 | −2.654488880E−02 |

TABLE 6B-continued

| Aspheric Coefficients | | | | |
|---|---|---|---|---|
| A18 = | −2.383013123E−02 | −3.159971523E−02 | 3.507905696E−02 | 7.483740314E−03 |
| A20 = | 4.194531653E−03 | 4.478388812E−03 | −6.752906328E−03 | −1.580650436E−03 |
| A22 = | −3.227346025E−04 | −3.699622403E−04 | 8.913140265E−04 | 2.439005845E−04 |
| A24 = | 4.625943948E−06 | 1.440347594E−05 | −7.751088143E−05 | −2.646934619E−05 |
| A26 = | — | −1.082515311E−07 | 4.024966188E−06 | 1.901693319E−06 |
| A28 = | — | — | −9.612511657E−08 | −8.082934079E−08 |
| A30 = | — | — | 1.191928297E−10 | 1.533795839E−09 |

In the 6th embodiment, the equation of the aspheric surface profiles of the aforementioned lens elements is the same as the equation of the 1st embodiment. Also, the definitions of these parameters shown in Table 6C below are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

| Values of Conditional Expressions | | | |
|---|---|---|---|
| f [mm] | 3.16 | f1234/f56 | 0.31 |
| Fno | 2.01 | f4/f1 | 86.59 |
| HFOV [deg.] | 45.2 | f5/f6 | −1.14 |
| FOV [deg.] | 90.3 | CT1/CT2 | 4.23 |
| (R1 + R12)/(R1 − R12) | 2.52 | CT1/max(CT2 − 6) | 1.85 |
| (R11 + R12)/(R11 − R12) | 1.94 | (T12 + T45)/T56 | 0.17 |
| (R5 + R6)/(R5 − R6) | 154.33 | T45/ΣAT | 0.03 |
| (R7 + R8)/(R7 − R8) | −65.56 | SD/TD | 0.97 |
| R11/R10 | 0.40 | EPD/BL | 1.69 |
| (V2 + V3)/V4 | 1.00 | ET1/CT1 | 0.74 |
| V3/V4 | 0.67 | TL/ImgH | 1.32 |
| (|f/f1| + |f/f6|)/(|f/f2| + |f/f3| + |f/f4| + |f/f5|) | 1.43 | Y1R1/ET1 | 1.25 |
| | | Y1R1/ImgH | 0.24 |
| f/fair45 | 1.13 | | |

7th Embodiment

Figure 13:
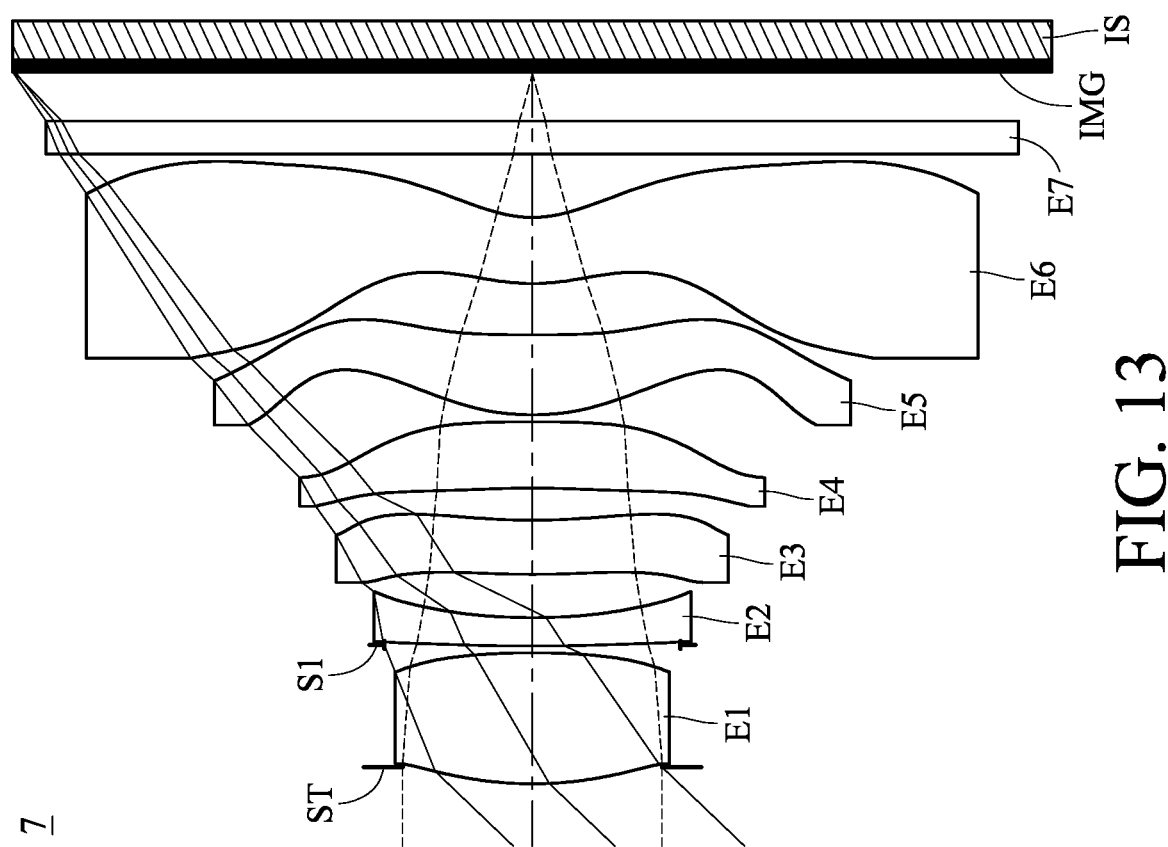
FIG. 13 is a schematic view of an image capturing unit according to the 7th embodiment of the present disclosure.
Figure 14:
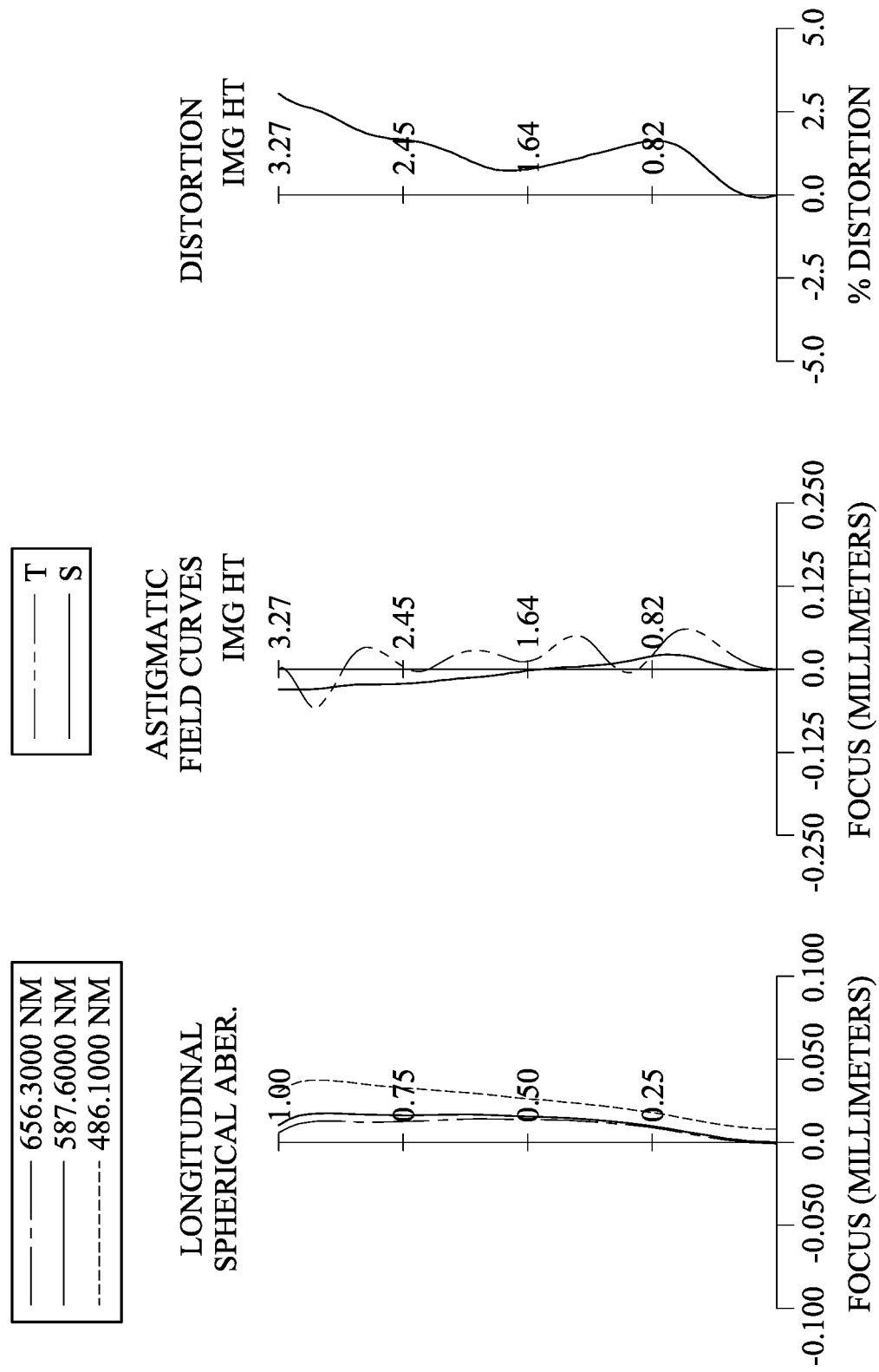
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging system lens assembly (its reference numeral is omitted) of the present disclosure and an image sensor IS. The imaging system lens assembly includes, in order from an object side to an image side along an optical axis, an aperture stop ST, a first lens element E1, a stop S1, a second lens element E2, a third lens element E3, a fourth lens element E4, a fifth lens element E5, a sixth lens element E6, a filter E7 and an image surface IMG. The imaging system lens assembly includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has two critical points in an off-axis region thereof. The image-side surface of the third lens element E3 has one critical point in an off-axis region thereof.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has four inflection points. The image-side surface of the fourth lens element E4 has two inflection points.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one critical point in an off-axis region thereof. The image-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has four inflection points. The image-side surface of the sixth lens element E6 has three inflection points. The object-side surface of the sixth lens element E6 has one critical point in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the imaging system lens assembly. The image sensor IS is disposed on or near the image surface IMG of the imaging system lens assembly.

The detailed optical data of the 7th embodiment are shown in Table 7A and the aspheric surface data are shown in Table 7B below.

TABLE 7A

7th Embodiment
f = 3.02 mm, Fno = 1.84, HFOV = 46.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.105 | | | | |
| 2 | Lens 1 | 2.2742 (ASP) | 0.830 | Glass | 1.497 | 81.5 | 3.31 |
| 3 | | −5.2098 (ASP) | 0.050 | | | | |
| 4 | Stop | Plano | −0.007 | | | | |
| 5 | Lens 2 | 16.6667 (ASP) | 0.180 | Plastic | 1.686 | 18.4 | −7.55 |
| 6 | | 3.9337 (ASP) | 0.274 | | | | |
| 7 | Lens 3 | 5.6055 (ASP) | 0.343 | Plastic | 1.639 | 23.5 | −24.96 |
| 8 | | 4.0481 (ASP) | 0.204 | | | | |
| 9 | Lens 4 | −5.4820 (ASP) | 0.420 | Plastic | 1.562 | 44.6 | −24.16 |
| 10 | | −9.4502 (ASP) | 0.043 | | | | |
| 11 | Lens 5 | 1.5235 (ASP) | 0.507 | Plastic | 1.544 | 56.0 | 3.12 |
| 12 | | 13.0952 (ASP) | 0.325 | | | | |
| 13 | Lens 6 | 1.2667 (ASP) | 0.420 | Plastic | 1.544 | 56.0 | −4.91 |
| 14 | | 0.7588 (ASP) | 0.400 | | | | |
| 15 | Filter | Plano | 0.210 | Glass | 1.517 | 64.2 | — |
| 16 | | Plano | 0.309 | | | | |
| 17 | Image | Plano | — | | | | |

Note:
Reference wavelength is 587.6 nm (d-line).
An effective radius of the stop S1 (Surface 4) is 0.937 mm.

TABLE 7B

Aspheric Coefficients

| Surface # | 2 | 3 | 5 | 6 |
|---|---|---|---|---|
| k = | −6.846590000E−02 | 4.652020000E+00 | 7.190540000E+01 | −2.672150000E+01 |
| A4 = | −5.353182797E−02 | −3.555359864E−02 | 6.707308852E−02 | 1.066630044E−01 |
| A6 = | 2.055820707E−01 | −5.629788275E−02 | −2.287465782E−01 | −5.286418614E−02 |
| A8 = | −1.176359478E+00 | −5.909737019E−01 | 4.100836159E−01 | −6.584515754E−02 |
| A10 = | 3.486901404E+00 | 2.176267822E+00 | −1.909672505E+00 | 7.052450484E−02 |
| A12 = | −6.359155124E+00 | −3.235942361E+00 | 6.911333807E+00 | 1.092973038E−01 |
| A14 = | 6.933476636E+00 | 2.324317682E+00 | −1.325202087E+01 | −1.503231307E−01 |
| A16 = | −4.204061960E+00 | −6.718122047E−01 | 1.414662242E+01 | 5.062322066E−02 |
| A18 = | 1.100473495E+00 | — | −8.058568338E+00 | — |
| A20 = | — | — | 1.915082330E+00 | — |

| Surface # | 7 | 8 | 9 | 10 |
|---|---|---|---|---|
| k = | 9.201070000E+00 | −2.118530000E+00 | −1.731610000E+01 | 7.526310000E+00 |
| A4 = | −1.491680403E−01 | −6.998296424E−02 | 5.696454065E−02 | −1.788253317E−02 |
| A6 = | −2.483897149E−01 | −9.025699071E−02 | 1.372079668E+00 | 1.452371734E−01 |
| A8 = | 1.647219319E+00 | 2.308880461E−02 | −9.143344955E+00 | −3.869691773E+00 |
| A10 = | −4.885623263E+00 | 4.496111225E−01 | 3.083813637E+01 | 1.579401865E+01 |
| A12 = | 8.332130940E+00 | −1.232038568E+00 | −6.593847140E+01 | −3.519575437E+01 |
| A14 = | −8.294830897E+00 | 1.587283131E+00 | 9.498884780E+01 | 5.171017866E+01 |
| A16 = | 4.413596193E+00 | −1.142288631E+00 | −9.380289242E+01 | −5.354033570E+01 |
| A18 = | −9.536010725E−01 | 4.339790062E−01 | 6.244324515E+01 | 4.011892083E+01 |
| A20 = | — | −6.647308159E−02 | −2.582956928E+01 | −2.188497183E+01 |
| A22 = | — | — | 4.496117390E+00 | 8.610381878E+00 |
| A24 = | — | — | 1.365059809E+00 | −2.380291749E+00 |
| A26 = | — | — | −1.028642177E+00 | 4.387064451E−01 |
| A28 = | — | — | 2.491886190E−01 | −4.840520392E−02 |
| A30 = | — | — | −2.299666655E−02 | 2.418638611E−03 |

| Surface # | 11 | 12 | 13 | 14 |
|---|---|---|---|---|
| k = | −1.000130000E+00 | 2.934470000E+01 | −4.781640000E+00 | −1.171100000E+00 |
| A4 = | 1.520986232E−01 | 8.881576804E−02 | −4.221827695E−01 | −7.342755384E−01 |
| A6 = | −7.033230959E−01 | 6.213952114E−01 | −1.468194560E−03 | 7.043547986E−01 |
| A8 = | 1.359787980E+00 | −2.315684376E+00 | 6.075129385E−01 | −4.788802769E−01 |
| A10 = | −2.208461938E+00 | 3.912608211E+00 | −1.038812578E+00 | 2.208895092E−01 |

TABLE 7B-continued

| Aspheric Coefficients | | | | |
|---|---|---|---|---|
| A12 = | 2.907799324E+00 | −4.241269099E+00 | 9.915633392E−01 | −6.165073534E−02 |
| A14 = | −2.950634238E+00 | 3.200053093E+00 | −6.112644149E−01 | 6.348019229E−03 |
| A16 = | 2.233924419E+00 | −1.733232129E+00 | 2.577981911E−01 | 2.243271193E−03 |
| A18 = | −1.242841706E+00 | 6.826225447E−01 | −7.665281969E−02 | −1.160456185E−03 |
| A20 = | 5.025488590E−01 | −1.957045666E−01 | 1.626165878E−02 | 2.653356315E−04 |
| A22 = | −1.453942031E−01 | 4.041117175E−02 | −2.451477950E−03 | −3.750823858E−05 |
| A24 = | 2.928099029E−02 | −5.855105504E−03 | 2.567980892E−04 | 3.456066938E−06 |
| A26 = | −3.900200198E−03 | 5.651066034E−04 | −1.777871805E−05 | −2.030779303E−07 |
| A28 = | 3.094166358E−04 | −3.264814867E−05 | 7.314891561E−07 | 6.935703199E−09 |
| A30 = | −1.110051344E−05 | 8.548562646E−07 | −1.353962268E−08 | −1.050266547E−10 |

In the 7th embodiment, the equation of the aspheric surface profiles of the aforementioned lens elements is the same as the equation of the 1st embodiment. Also, the definitions of these parameters shown in Table 7C below are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Values of Conditional Expressions | | | |
|---|---|---|---|
| f [mm] | 3.02 | f1234/f56 | 1.63 |
| Fno | 1.84 | f4/f1 | −7.30 |
| HFOV [deg.] | 46.3 | f5/f6 | −0.64 |
| FOV [deg.] | 92.5 | CT1/CT2 | 4.61 |
| (R1 + R12)/(R1 − R12) | 2.00 | CT1/max(CT2 − 6) | 1.64 |
| (R11 + R12)/(R11 − R12) | 3.99 | (T12 + T45)/T56 | 0.26 |
| (R5 + R6)/(R5 − R6) | 6.20 | T45/ΣAT | 0.05 |
| (R7 + R8)/(R7 − R8) | −3.76 | SD/TD | 0.97 |
| R11/R10 | 0.10 | EPD/BL | 1.79 |
| (V2 + V3)/V4 | 0.94 | ET1/CT1 | 0.70 |
| V3/V4 | 0.53 | TL/ImgH | 1.38 |
| (\|f/f1\| + \|f/f6\|)/(\|f/f2\| + \|f/f3\| + \|f/f4\| + \|f/f5\|) | 0.95 | Y1R1/ET1 | 1.42 |
| | | Y1R1/ImgH | 0.25 |
| f/fair45 | 0.81 | | |

8th Embodiment

Figure 15:
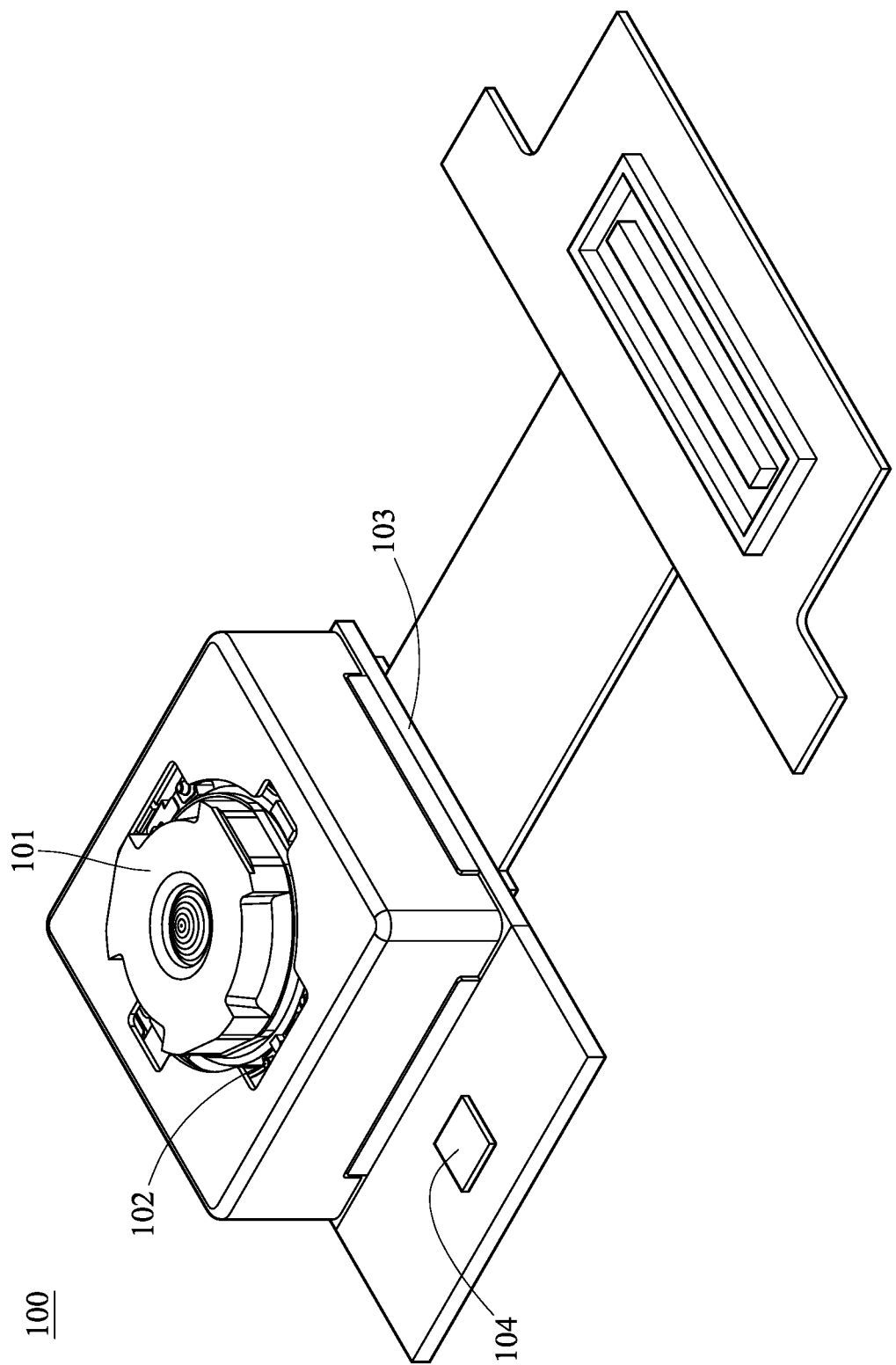
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 100 is a camera module including a lens unit 101, a driving device 102, an image sensor 103 and an image stabilizer 104. The lens unit 101 includes the imaging system lens assembly as disclosed in the 1st embodiment, a barrel and a holder member (their reference numerals are omitted) for holding the imaging system lens assembly. However, the lens unit 101 may alternatively be provided with the imaging system lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials or liquid lenses. The driving device 102 is favorable for obtaining a better imaging position of the lens unit 101, so that a clear image of the imaged object can be captured by the lens unit 101 with different object distances or different temperature environments. The image sensor 103 (for example, CCD or CMOS), which can feature high photosensitivity and low noise, is disposed on the image surface of the imaging system lens assembly to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

9th Embodiment

Figure 16:
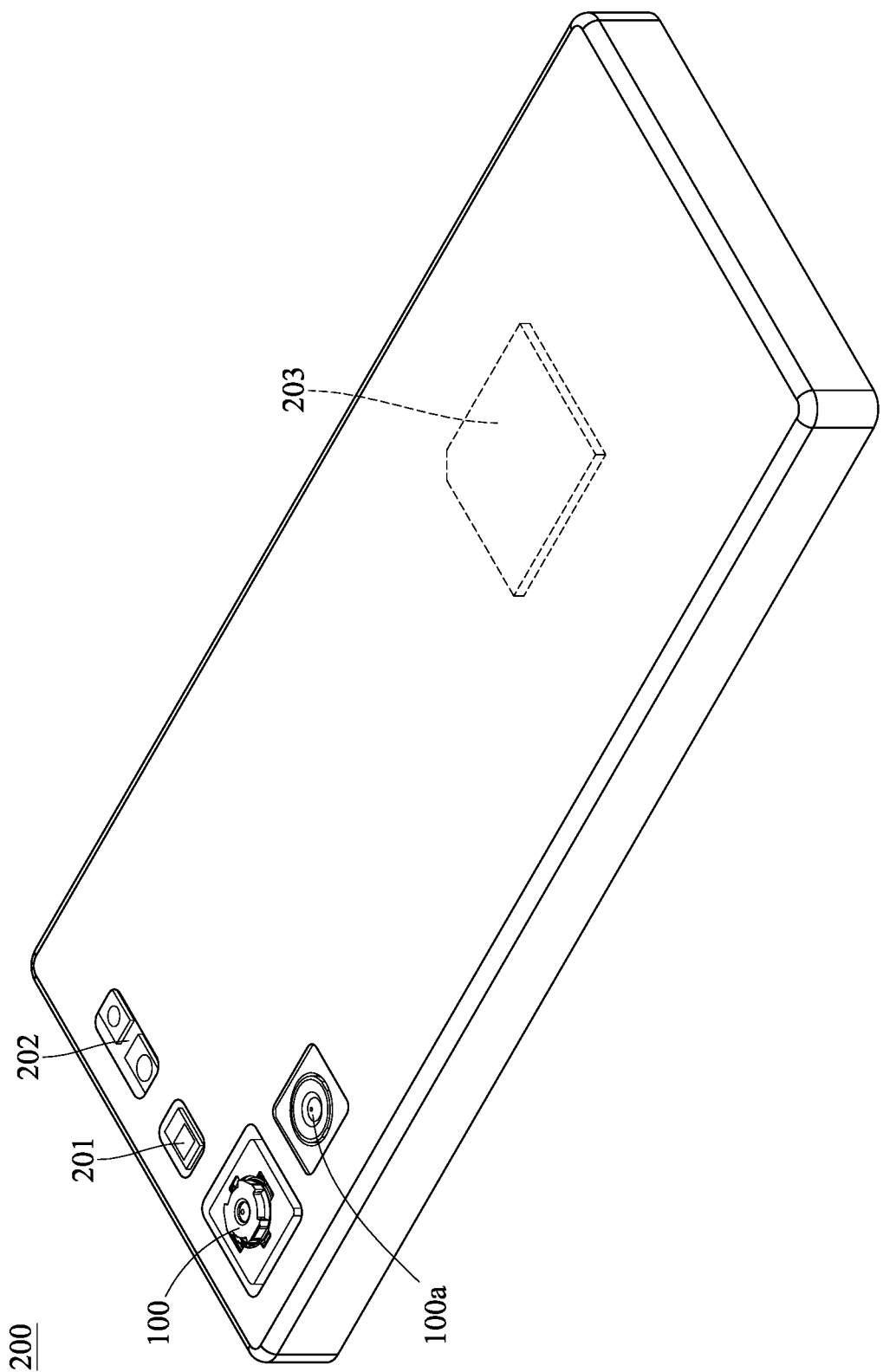
FIG. 16 is one perspective view of an electronic device according to the 9th embodiment of the present disclosure.
Figure 17:
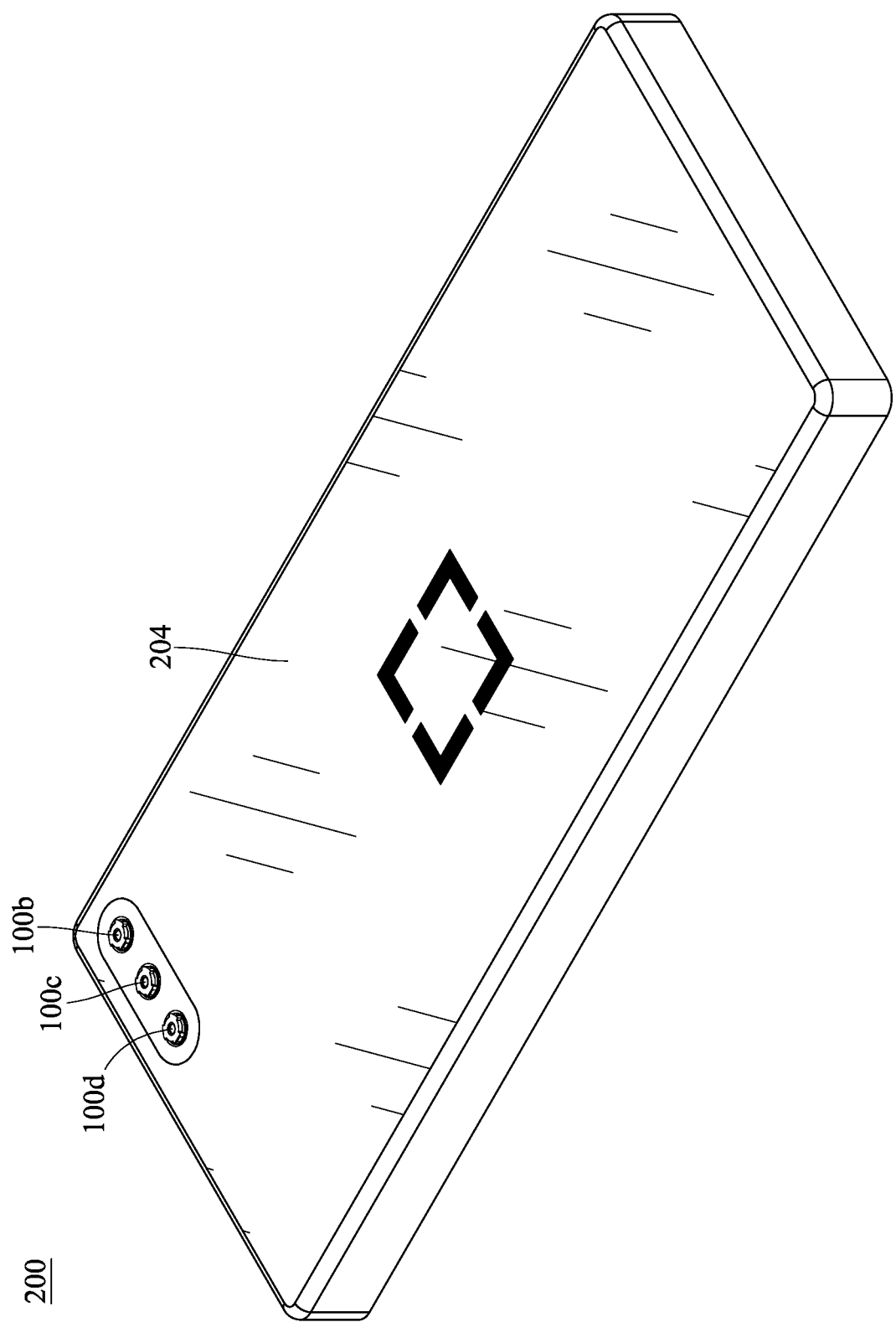
FIG. 17 is another perspective view of the electronic device in FIG. 16.
Figure 18:
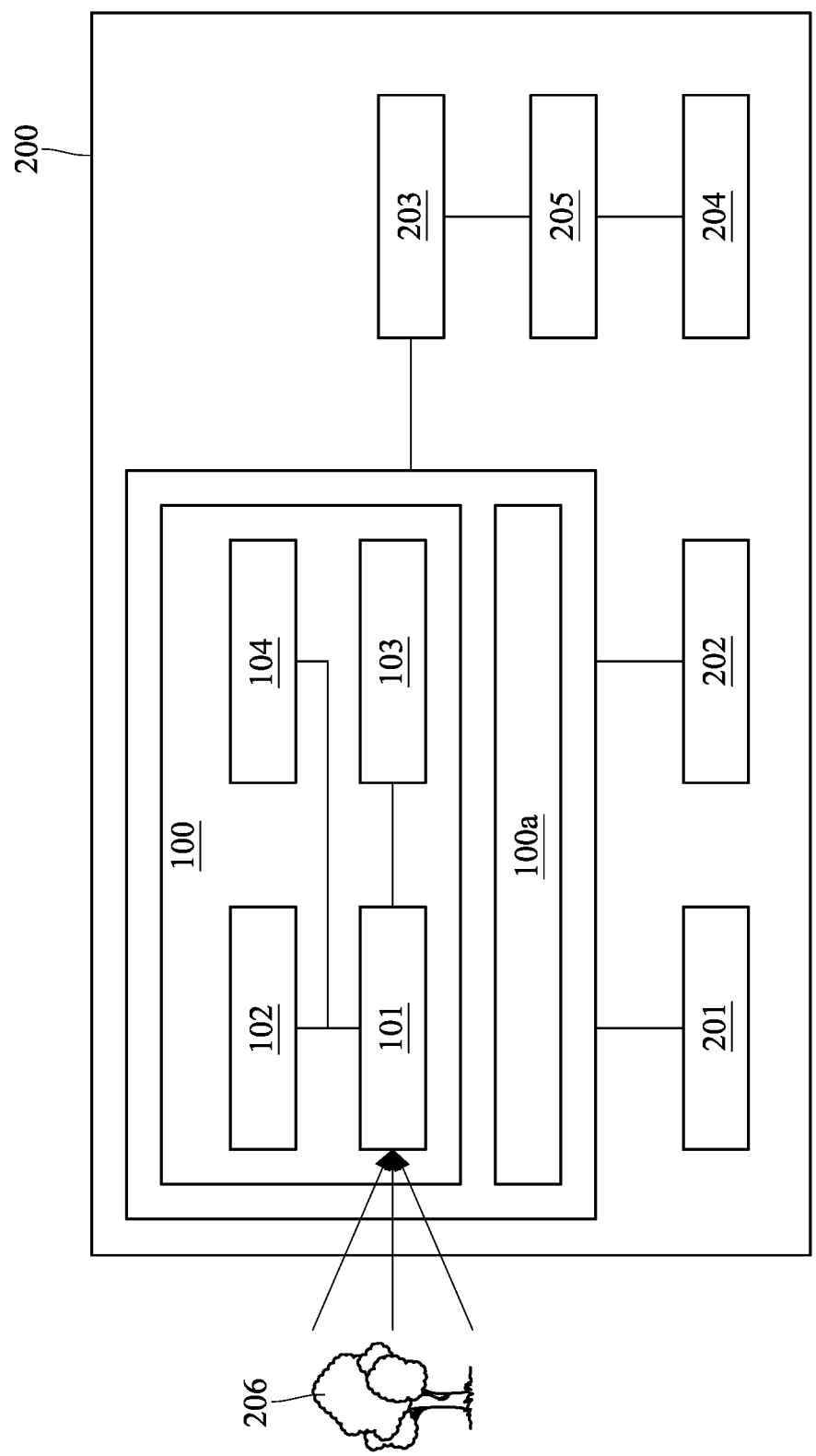
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16.

In this embodiment, an electronic device 200 is a smartphone including the image capturing unit 100 disclosed in the 8th embodiment, an image capturing unit 100a, an image capturing unit 100b, an image capturing unit 100c, an image capturing unit 100d, a flash module 201, a focus assist module 202, an image signal processor 203, a display module 204 and an image software processor 205. The image capturing unit 100 and the image capturing unit 100a are disposed on the same side of the electronic device 200 and each of the image capturing units 100 and 100a has a single focal point. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the imaging system lens assembly of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include an optical lens assembly such as the imaging system lens assembly of the present disclosure, a barrel and a holder member for holding the optical lens assembly.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100 and 100a have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204.

10th Embodiment

Figure 19:
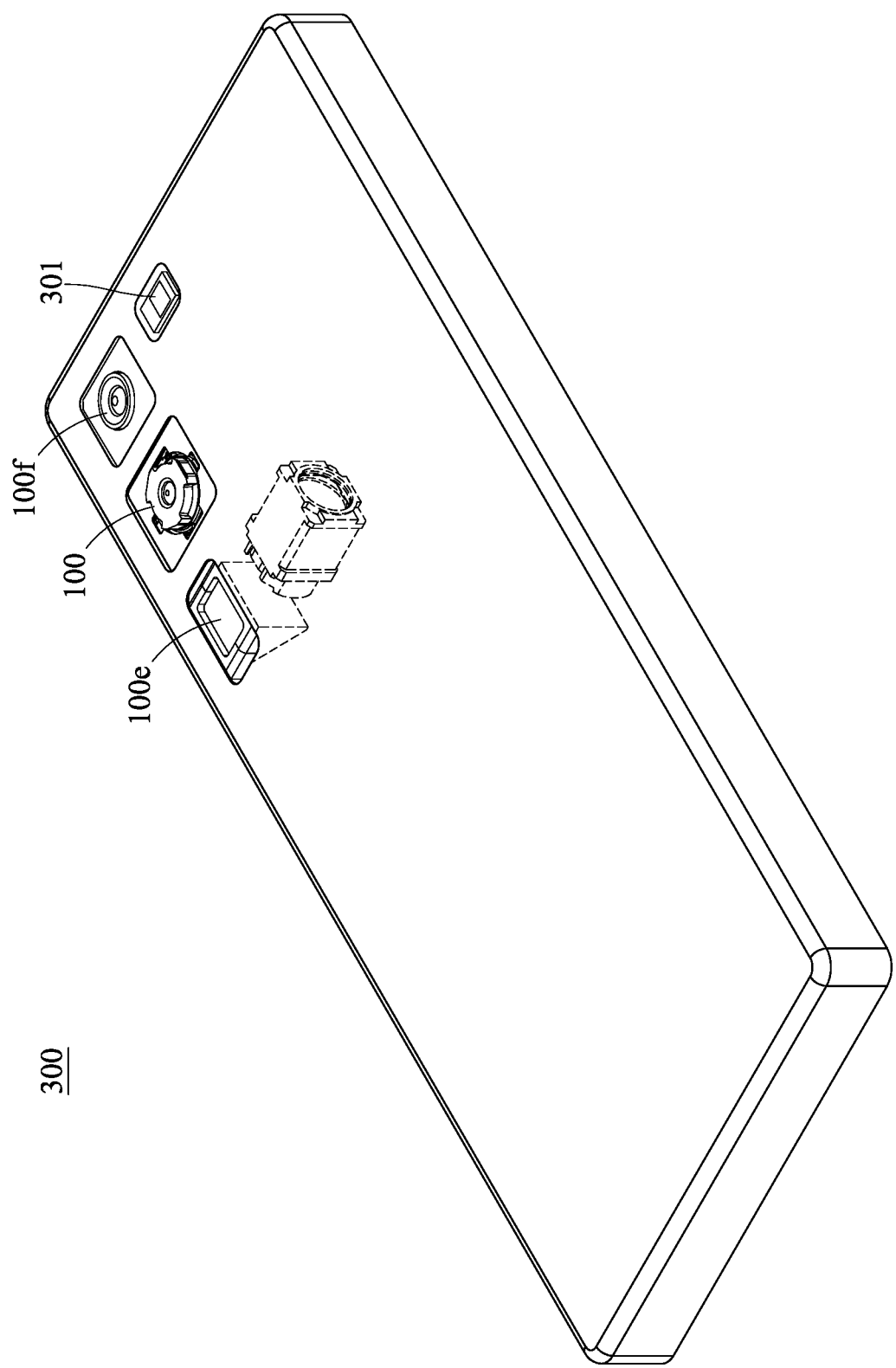
FIG. 19 is one perspective view of an electronic device according to the 10th embodiment of the present disclosure.

FIG. 19 is one perspective view of an electronic device according to the 10th embodiment of the present disclosure.

In this embodiment, an electronic device 300 is a smartphone including the image capturing unit 100 disclosed in the 8th embodiment, an image capturing unit 100e, an image capturing unit 100f, a flash module 301, a focus assist module, an image signal processor, a display module and an image software processor (not shown). The image capturing unit 100, the image capturing unit 100e and the image capturing unit 100f are disposed on the same side of the electronic device 300, while the display module is disposed on the opposite side of the electronic device 300. Furthermore, each of the image capturing units 100e and 100f can include the imaging system lens assembly of the present disclosure and can have a configuration similar to that of the image capturing unit 100, and the details in this regard will not be provided again.

The image capturing unit 100 is a wide-angle image capturing unit, the image capturing unit 100e is a telephoto image capturing unit, and the image capturing unit 100f is an ultra-wide-angle image capturing unit. In this embodiment, the image capturing units 100, 100e and 100f have different fields of view, such that the electronic device 300 can have various magnification ratios so as to meet the requirement of optical zoom functionality. Moreover, the image capturing unit 100e can be a telephoto image capturing unit having a light-folding element configuration, such that the total track length of the image capturing unit 100e is not limited by the thickness of the electronic device 300. Moreover, the light-folding element configuration of the image capturing unit 100e can be similar to, for example, one of the structures shown in FIG. 24 to FIG. 26, which can be referred to foregoing descriptions corresponding to FIG. 24 to FIG. 26, and the details in this regard will not be provided again. In this embodiment, the electronic device 300 includes multiple image capturing units 100, 100e and 100f, but the present disclosure is not limited to the number and arrangement of image capturing units. When a user captures images of an object, light rays converge in the image capturing unit 100, 100e or 100f to generate images, and the flash module 301 is activated for light supplement. Further, the subsequent processes are performed in a manner similar to the abovementioned embodiment, so the details in this regard will not be provided again.

11th Embodiment

Figure 20:
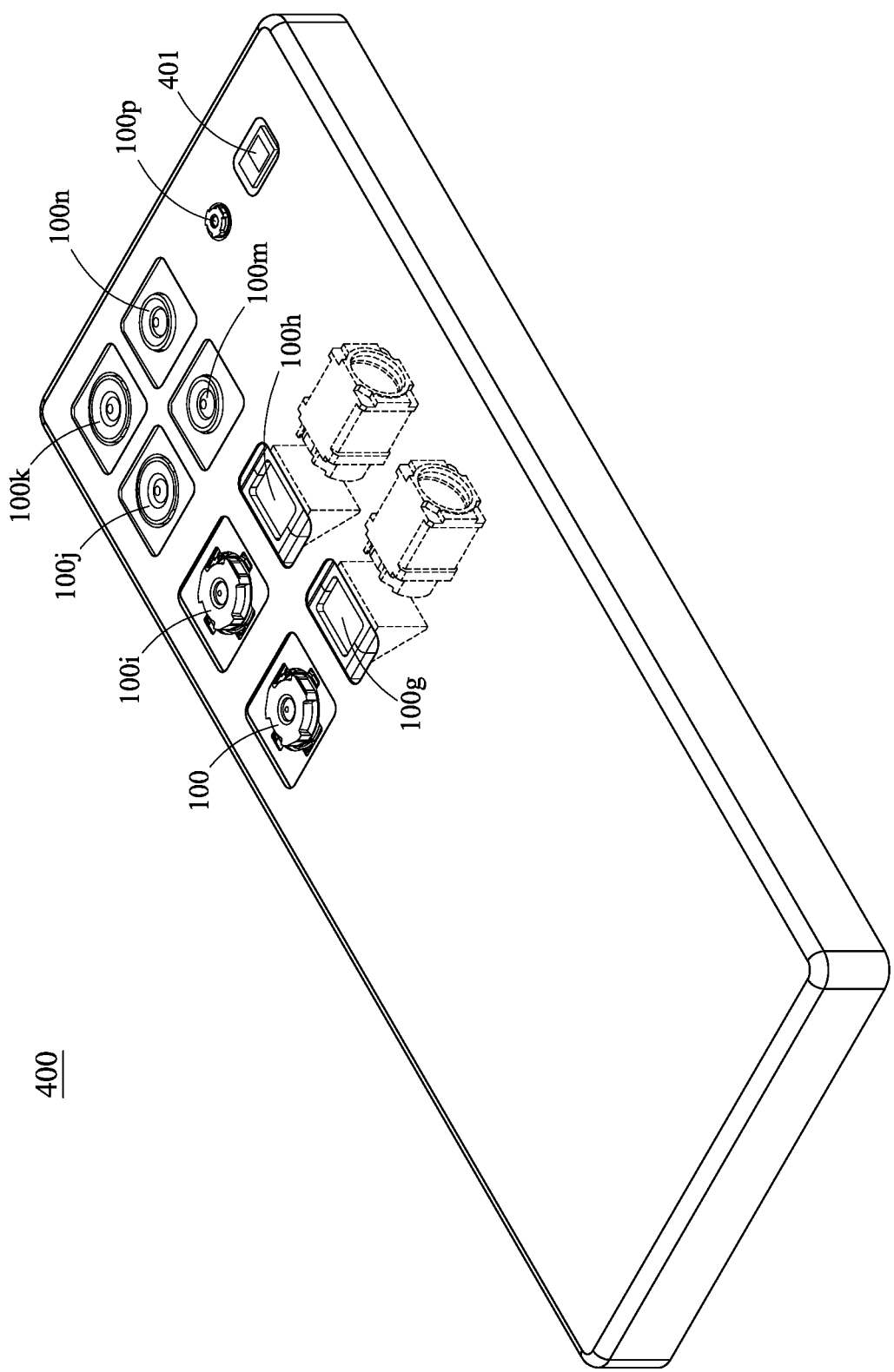
FIG. 20 is one perspective view of an electronic device according to the 11th embodiment of the present disclosure.

FIG. 20 is one perspective view of an electronic device according to the 11th embodiment of the present disclosure.

In this embodiment, an electronic device 400 is a smartphone including the image capturing unit 100 disclosed in the 8th embodiment, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 401, a focus assist module, an image signal processor, a display module and an image software processor (not shown). The image capturing units 100, 100g, 100h, 100i, 100j, 100k, 100m, 100n and 100p are disposed on the same side of the electronic device 400, while the display module is disposed on the opposite side of the electronic device 400. Furthermore, each of the image capturing units 100g, 100h, 100i, 100j, 100k, 100m, 100n and 100p can include the imaging system lens assembly of the present disclosure and can have a configuration similar to that of the image capturing unit 100, and the details in this regard will not be provided again.

The image capturing unit 100 is a wide-angle image capturing unit, the image capturing unit 100g is a telephoto image capturing unit, the image capturing unit 100h is a telephoto image capturing unit, the image capturing unit 100i is a wide-angle image capturing unit, the image capturing unit 100j is an ultra-wide-angle image capturing unit, the image capturing unit 100k is an ultra-wide-angle image capturing unit, the image capturing unit 100m is a telephoto image capturing unit, the image capturing unit 100n is a telephoto image capturing unit, and the image capturing unit 100p is a ToF image capturing unit. In this embodiment, the image capturing units 100, 100g, 100h, 100i, 100j, 100k, 100m and 100n have different fields of view, such that the electronic device 400 can have various magnification ratios so as to meet the requirement of optical zoom functionality. Moreover, each of the image capturing units 100g and 100h can be a telephoto image capturing unit having a light-folding element configuration. Moreover, the light-folding element configuration of each of the image capturing unit 100g and 100h can be similar to, for example, one of the structures shown in FIG. 24 to FIG. 26, which can be referred to foregoing descriptions corresponding to FIG. 24 to FIG. 26, and the details in this regard will not be provided again. In addition, the image capturing unit 100p can determine depth information of the imaged object. In this embodiment, the electronic device 400 includes multiple image capturing units 100, 100g, 100h, 100i, 100j, 100k, 100m, 100n and 100p, but the present disclosure is not limited to the number and arrangement of image capturing units. When a user captures images of an object, the light rays converge in the image capturing unit 100, 100g, 100h, 100i, 100j, 100k, 100m, 100n or 100p to generate images, and the flash module 401 is activated for light supplement. Further, the subsequent processes are performed in a manner similar to the abovementioned embodiments, and the details in this regard will not be provided again.

12th Embodiment

Figure 21:
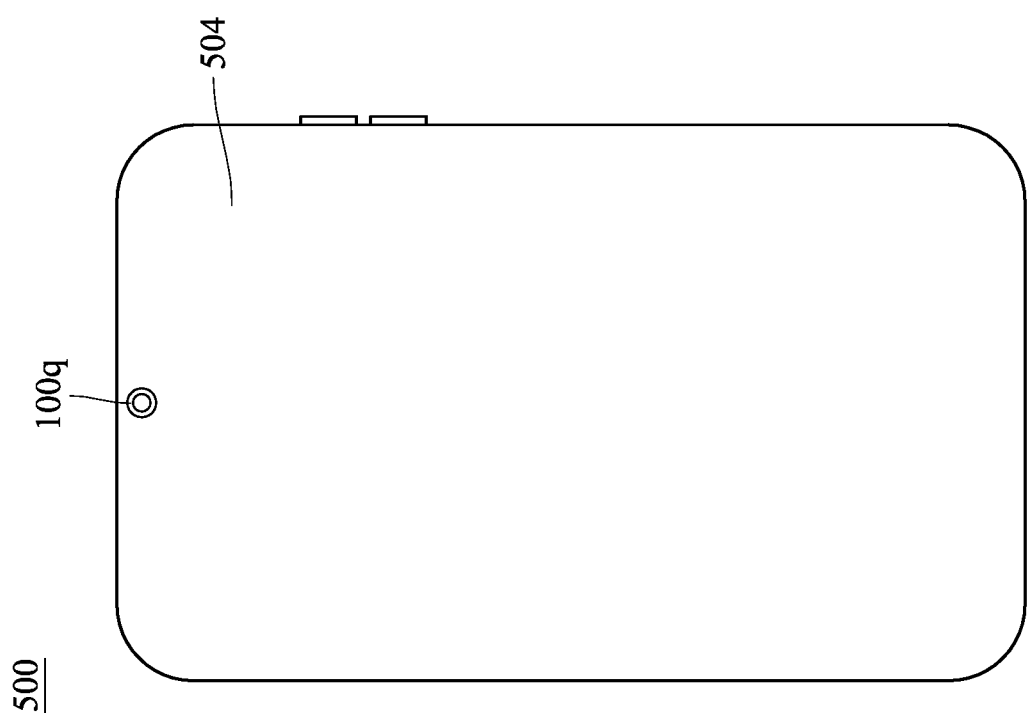
FIG. 21 is one perspective view of an electronic device according to the 12th embodiment of the present disclosure.
Figure 22:
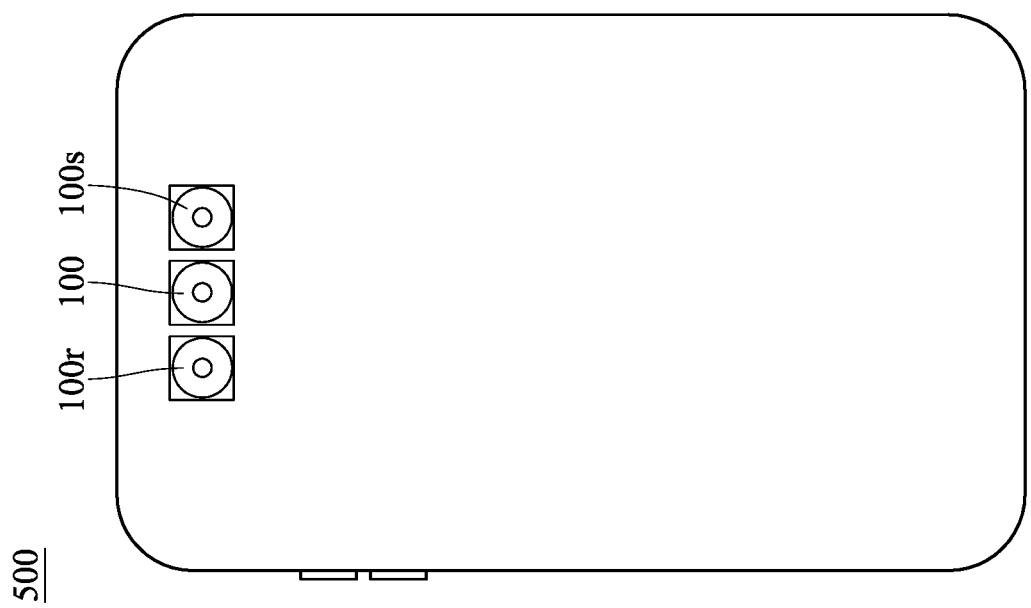
FIG. 22 is another perspective view of the electronic device in FIG. 21.

FIG. 21 is one perspective view of an electronic device according to the 12th embodiment of the present disclosure, and FIG. 22 is another perspective view of the electronic device in FIG. 21.

In this embodiment, an electronic device 500 is a smartphone including the image capturing unit 100 disclosed in the 8th embodiment, an image capturing unit 100q, an image capturing unit 100r, an image capturing unit 100s and a display module 504.

In this embodiment, the image capturing unit 100, the image capturing unit 100r and the image capturing unit 100s are disposed on the same side of the electronic device 500, and the image capturing unit 100q and the display module 504 are disposed on the opposite side of the electronic device 500. The image capturing unit 100q can be a front-facing camera of the electronic device 500 for taking selfies, but the present disclosure is not limited thereto. Furthermore, each of the image capturing units 100q, 100r and 100s can include the imaging system lens assembly of the present disclosure and can have a configuration similar to that of the image capturing unit 100, and the details in this regard will not be provided again.

The image capturing unit 100 is a wide-angle image capturing unit, the image capturing unit 100r is a telephoto image capturing unit, and the image capturing unit 100s is an ultra-wide-angle image capturing unit. In this embodiment, the image capturing units 100, 100r and 100s have different fields of view, such that the electronic device 500 can have various magnification ratios so as to meet the requirement of optical zoom functionality for various applications with different requirements. The image capturing unit 100q can have a non-circular opening, and optical components in the image capturing unit 100q can have trimmed edges at their outermost positions so as to coordinate with the shape of the non-circular opening. Therefore, it is favorable for reducing the size of the image capturing unit 100q so as to increase the ratio of the area of the display module 504 relative to that of the electronic device 500, and reduce the thickness of the electronic device 500. In this embodiment, the electronic device 500 includes multiple image capturing units 100, 100q, 100r and 100s, but the present disclosure is not limited to the number and arrangement of image capturing units.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the imaging system lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-7C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the second lens element has negative refractive power, the fourth lens element has negative refractive power, the fifth lens element has positive refractive power, the image-side surface of the fifth lens element is concave in a paraxial region thereof, the sixth lens element has negative refractive power, the image-side surface of the sixth lens element has at least one inflection point, and a central thickness of the first lens element is a maximum among central thicknesses of all lens elements of the imaging system lens assembly;

wherein the imaging system lens assembly further comprises an aperture stop, a curvature radius of the object-side surface of the first lens element is R1, a curvature radius of the image-side surface of the sixth lens element is R12, an Abbe number of the second lens element is V2, an Abbe number of the third lens element is V3, an Abbe number of the fourth lens element is V4, an axial distance between the aperture stop and the image-side surface of the sixth lens element is SD, an axial distance between the object-side surface of the first lens element and the image-side surface of the sixth lens element is TD, an axial distance between the first lens element and the second lens element is T12, an axial distance between the fourth lens element and the fifth lens element is T45, an axial distance between the fifth lens element and the sixth lens element is T56, and the following conditions are satisfied:

$0.80<(R1+R12)/(R1-R12)<4.00;$ $0.30<(V2+V3)/V4<1.30;$ $0.92<SD/TD<1.20;$ and $0.20\leq(T12+T45)/T56<5.00.$ 2. The imaging system lens assembly of claim 1, wherein the image-side surface of the first lens element is convex in a paraxial region thereof, and the object-side surface of the fifth lens element is convex in a paraxial region thereof.

3. The imaging system lens assembly of claim 1, wherein an f-number of the imaging system lens assembly is Fno, and the following condition is satisfied:

1.50<Fno<2.00.

4. The imaging system lens assembly of claim 1, wherein an entrance pupil diameter of the imaging system lens assembly is EPD, an axial distance between the image-side surface of the sixth lens element and an image surface is BL, and the following condition is satisfied:

1.20<EPD/BL<4.00.

5. The imaging system lens assembly of claim 1, wherein a maximum effective radius of the object-side surface of the first lens element is Y1R1, a distance in parallel with an optical axis between a maximum effective radius position of the object-side surface of the first lens element and a maximum effective radius position of the image-side surface of the first lens element is ET1, a maximum field of view of the imaging system lens assembly is FOV, and the following conditions are satisfied:

0.50<Y1R1/ET1<2.00; and 86.0 degrees<FOV<130.0 degrees.

6. The imaging system lens assembly of claim 1, wherein a curvature radius of the object-side surface of the fourth lens element is R7, a curvature radius of the image-side surface of the fourth lens element is R8, and the following condition is satisfied:

−50.00<(R7+R8)/(R7−R8)<0.00.

7. The imaging system lens assembly of claim 1, wherein an axial distance between the object-side surface of the first lens element and an image surface is TL, a maximum image height of the imaging system lens assembly is ImgH, and the following condition is satisfied:

0.10<TL/ImgH<1.50.

8. The imaging system lens assembly of claim 1, wherein a focal length of the imaging system lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following condition is satisfied:

0.20<(|f/f1|+|f/f6|)/(|f/f2|+|f/f3|+|f/f4|+|f/f5|)<1.10.

9. An image capturing unit comprising:
the imaging system lens assembly of claim 1; and
an image sensor disposed on an image surface of the imaging system lens assembly.

10. An electronic device comprising:
the image capturing unit of claim 9.

11. An imaging system lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
wherein the first lens element has positive refractive power, the object-side surface of the first lens element is convex in a paraxial region thereof, the image-side surface of the first lens element is convex in a paraxial region thereof, the second lens element has negative refractive power, the fifth lens element has positive refractive power, the sixth lens element has negative refractive power, and the image-side surface of the sixth lens element has at least one inflection point;
wherein a central thickness of the first lens element is CT1, a maximum value among central thicknesses of the second lens element to the sixth lens element is max (CT2-6), a focal length of the imaging system lens assembly is f, a composite focal length of the first lens element, the second lens element, the third lens element and the fourth lens element is f1234, a composite focal length of the fifth lens element and the sixth lens element is f56, a refractive index of the fourth lens element is N4, a refractive index of the fifth lens element is N5, a curvature radius of the image-side surface of the fourth lens element is R8, a curvature radius of the object-side surface of the fifth lens element is R9, an axial distance between the fourth lens element and the fifth lens element is T45, an Abbe number of the third lens element is V3, an Abbe number of the fourth lens element is V4, a maximum field of view of the imaging system lens assembly is FOV, and the following conditions are satisfied:

1.40<CT1/max(CT2−6)<5.00;

0.60<f/fair45<3.00, wherein 1/fair45=[(1−N4)/(N5× R8)−F(N5−1)/(N5×R9)]−{[(1−N4)×(N5−1)× T45]/(N5×R8×R9)};

0.45<V3/V4<0.90;

86.0 degrees<FOV<130.0 degrees; and 0.40<f1234/f56<5.00.

12. The imaging system lens assembly of claim 11, wherein the object-side surface of the second lens element is convex in a paraxial region thereof, the image-side surface of the second lens element is concave in a paraxial region thereof, and the image-side surface of the fifth lens element is concave in a paraxial region thereof.

13. The imaging system lens assembly of claim 11, wherein a focal length of the first lens element is f1, a focal length of the fourth lens element is f4, and the following condition is satisfied:

−30.00<f4/f1<10.00.

14. The imaging system lens assembly of claim 11, wherein a curvature radius of the object-side surface of the sixth lens element is R11, a curvature radius of the image-side surface of the sixth lens element is R12, and the following condition is satisfied:

2.00<(R11+R12)/(R11−R12)<13.00.

15. The imaging system lens assembly of claim 11, wherein a distance in parallel with an optical axis between a maximum effective radius position of the object-side surface of the first lens element and a maximum effective radius position of the image-side surface of the first lens element is ET1, the central thickness of the first lens element is CT1, and the following condition is satisfied:

0.50<ET1/CT1<2.00.

16. The imaging system lens assembly of claim 11, wherein a maximum effective radius of the object-side surface of the first lens element is Y1R1, a maximum image height of the imaging system lens assembly is ImgH, and the following condition is satisfied:

0.10<Y1R1/ImgH<0.40.

17. The imaging system lens assembly of claim 11, wherein the composite focal length of the first lens element, the second lens element, the third lens element and the fourth lens element is f1234, the composite focal length of the fifth lens element and the sixth lens element is f56, and the following condition is satisfied:

$$0.80 < f1234/f56 < 3.50.$$

18. The imaging system lens assembly of claim 11, wherein the axial distance between the fourth lens element and the fifth lens element is T45, a sum of axial distances between each of all adjacent lens elements of the imaging system lens assembly is ΣAT, and the following condition is satisfied:

$$0.01 < T45/\Sigma AT < 0.10.$$

19. An imaging system lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
wherein the first lens element has positive refractive power, the second lens element has negative refractive power, the fifth lens element has positive refractive power, the image-side surface of the fifth lens element is concave in a paraxial region thereof, the sixth lens element has negative refractive power, the image-side surface of the sixth lens element has at least one inflection point, and a central thickness of the first lens element is a maximum among central thicknesses of all lens elements of the imaging system lens assembly;
wherein an f-number of the imaging system lens assembly is Fno, a curvature radius of the object-side surface of the first lens element is R1, a curvature radius of the image-side surface of the sixth lens element is R12, a maximum effective radius of the object-side surface of the first lens element is Y1R1, a distance in parallel with an optical axis between a maximum effective radius position of the object-side surface of the first lens element and a maximum effective radius position of the image-side surface of the first lens element is ET1, a focal length of the fifth lens element is f5, a focal length of the sixth lens element is f6, and the following conditions are satisfied:

$$1.50 < Fno < 2.10;$$

$$1.20 < (R1+R12)/(R1-R12) < 3.00;$$

$$0.50 < Y1R1/ET1 < 2.00; \text{ and}$$

$$-1.00 < f5/f6 < 1.00.$$

20. The imaging system lens assembly of claim 19, wherein the image-side surface of the first lens element is convex in a paraxial region thereof, and the image-side surface of the third lens element is concave in a paraxial region thereof.

21. The imaging system lens assembly of claim 19, wherein a curvature radius of the image-side surface of the fifth lens element is R10, a curvature radius of the object-side surface of the sixth lens element is R11, and the following condition is satisfied:

$$-0.10 < R11/R10 < 0.25.$$

22. The imaging system lens assembly of claim 19, wherein the fourth lens element has negative refractive power;
wherein an axial distance between the first lens element and the second lens element is T12, an axial distance between the fourth lens element and the fifth lens element is T45, an axial distance between the fifth lens element and the sixth lens element is T56, and the following condition is satisfied:

$$0.20 \leq (T12+T45)/T56 < 5.00.$$

23. The imaging system lens assembly of claim 19, wherein a maximum field of view of the imaging system lens assembly is FOV, and the following condition is satisfied:

$$86.0 \text{ degrees} < FOV < 130.0 \text{ degrees}.$$

24. The imaging system lens assembly of claim 19, wherein the central thickness of the first lens element is CT1, a central thickness of the second lens element is CT2, and the following condition is satisfied:

$$3.50 < CT1/CT2 < 8.00.$$

25. The imaging system lens assembly of claim 19, wherein the focal length of the fifth lens element is f5, the focal length of the sixth lens element is f6, and the following condition is satisfied:

$$-1.00 < f5/f6 < 0.00.$$

26. The imaging system lens assembly of claim 19, wherein a curvature radius of the object-side surface of the third lens element is R5, a curvature radius of the image-side surface of the third lens element is R6, and the following condition is satisfied:

$$-20.00 < (R5+R6)/(R5-R6) < 80.00.$$

* * * * *

UNITED STATES PATENT AND TRADEMARK OFFICE
CERTIFICATE OF CORRECTION

PATENT NO. : 12,436,367 B2
APPLICATION NO. : 17/885418
DATED : October 7, 2025
INVENTOR(S) : Lin et al.

Page 1 of 1

It is certified that error appears in the above-identified patent and that said Letters Patent is hereby corrected as shown below:

In the Specification

Column 2, Lines 36-39 (SUMMARY):
Delete:
"$0.60 < f/fair45 < 3.00$, wherein $1/fair45 = (1-N4)/(N5 \times R8)+(N5-1)/(N5 \times R9)-(1-N4) \times (N5-1) \times T45/(N5 \times R8 \times R9)$"
And insert therefor:
--$0.60 < f/fair45 < 3.00$, wherein $1/fair45 = [(1-N4)/(N5 \times R8)]+[(N5-1)/(N5 \times R9)]-\{[(1-N4) \times (N5-1) \times T45]/(N5 \times R8 \times R9)\}$--

Column 6, Lines 25-26 (DETAILED DESCRIPTION):
Delete:
"$0.60 < f/fair45 < 3.00$, wherein $1/fair45 = (1-N4)/(N5 \times R8)-F(N5-1)/(N5 \times R9)-(1-N4) \times (N5-1) \times T45/(N5 \times R8 \times R9)$"
And insert therefor:
--$0.60 < f/fair45 < 3.00$, wherein $1/fair45 = [(1-N4)/(N5 \times R8)]+[(N5-1)/(N5 \times R9)]-\{[(1-N4) \times (N5-1) \times T45]/(N5 \times R8 \times R9)\}$--

In the Claims

Column 48, Lines 26-28 (Claim 11):
Delete:
"$0.60 < f/fair45 < 3.00$, wherein $1/fair45 = [(1-N4)/(N5 \times R8)-F(N5-1)/(N5 \times R9)]-\{(1-N4) \times (N5-1) \times T45\}/(N5 \times R8 \times R9)\}$"
And insert therefor:
--$0.60 < f/fair45 < 3.00$, wherein $1/fair45 = [(1-N4)/(N5 \times R8)]+[(N5-1)/(N5 \times R9)]-\{[(1-N4) \times (N5-1) \times T45]/(N5 \times R8 \times R9)\}$--

Signed and Sealed this
Ninth Day of December, 2025

John A. Squires
*Director of the United States Patent and Trademark Office*